United States Patent
Thomas-Alyea et al.

(10) Patent No.: US 10,700,377 B2
(45) Date of Patent: Jun. 30, 2020

(54) SOLID ELECTROLYTE FOR A NEGATIVE ELECTRODE OF A SECONDARY BATTERY INCLUDING FIRST AND SECOND SOLID ELECTROLYTES WITH DIFFERENT AFFINITIES FOR METAL DEPOSITION ELECTRONCHEMICAL CELL AND METHOD OF MANUFACTURING

(71) Applicants: Samsung Electronics Co., Ltd., Gyeonggi-do (KR); Corning Incorporated, Corning, NY (US)

(72) Inventors: Karen E. Thomas-Alyea, Arlington, MA (US); Yong-Gun Lee, Suwon (KR); Lincoln Miara, Cambridge, MA (US); Hyunseok Kim, Suwon (KR); Jusik Kim, Suwon (KR); Michael E. Badding, Campbell, NY (US); Zhen Song, Painted Post, NY (US)

(73) Assignees: SAMSUNG ELECTRONICS CO., LTD., Gyeonggi-Do (KR); CORNING INCORPORATED, Corning, NY (US)

( * ) Notice: Subject to any disclaimer, the term of this patent is extended or adjusted under 35 U.S.C. 154(b) by 175 days.

(21) Appl. No.: 15/869,743

(22) Filed: Jan. 12, 2018

(65) Prior Publication Data
US 2018/0205112 A1    Jul. 19, 2018

Related U.S. Application Data
(60) Provisional application No. 62/447,005, filed on Jan. 17, 2017.

(51) Int. Cl.
*H01M 10/056* (2010.01)
*H01M 10/052* (2010.01)
(Continued)

(52) U.S. Cl.
CPC ....... *H01M 10/056* (2013.01); *H01M 4/0404* (2013.01); *H01M 4/661* (2013.01);
(Continued)

(58) Field of Classification Search
CPC .. H01M 10/05; H01M 10/052; H01M 10/056; H01M 10/058; H01M 4/0404; H01M 4/661
(Continued)

(56) References Cited

U.S. PATENT DOCUMENTS

| | | | | |
|---|---|---|---|---|
| 4,239,839 A | * | 12/1980 | McDowall | H01M 10/0413 429/154 |
| 4,439,502 A | | 3/1984 | Bittihn et al. | |

(Continued)

FOREIGN PATENT DOCUMENTS

| | | |
|---|---|---|
| CN | 103579707 A | 2/2014 |
| EP | 2421081 A1 | 2/2012 |

(Continued)

OTHER PUBLICATIONS

"Length." The Merriam-Webster.com Dictionary, Merriam-Webster Inc., https://www.merriam-webster.com/dictionary/length. Accessed Dec. 16, 2019. (Year: 2019).*
(Continued)

*Primary Examiner* — Sean P Cullen
(74) *Attorney, Agent, or Firm* — Cantor Colburn LLP

(57) ABSTRACT

A solid electrolyte for a negative electrode of a secondary battery includes a first solid electrolyte having a first surface and a second solid electrolyte on the first solid electrolyte and having a second surface. The first solid electrolyte and the second solid electrolyte each have an ionic conductivity effective for a deposition metal, and the first surface and the second surface are different in composition, structure, or both. An electrode assembly and an electrochemical cell
(Continued)

including the solid electrolyte and method for the manufacture thereof are also described.

41 Claims, 6 Drawing Sheets

(51) Int. Cl.
   *H01M 4/66* (2006.01)
   *H01M 10/058* (2010.01)
   *H01M 4/04* (2006.01)
   *H01M 10/05* (2010.01)
   *H01M 4/02* (2006.01)
   *H01M 10/0562* (2010.01)
   *H01M 10/0565* (2010.01)

(52) U.S. Cl.
   CPC ......... *H01M 10/05* (2013.01); *H01M 10/052* (2013.01); *H01M 10/058* (2013.01); *H01M 10/0562* (2013.01); *H01M 10/0565* (2013.01); *H01M 2004/021* (2013.01); *H01M 2004/027* (2013.01); *H01M 2300/0068* (2013.01); *H01M 2300/0074* (2013.01); *H01M 2300/0082* (2013.01); *H01M 2300/0088* (2013.01)

(58) Field of Classification Search
   USPC ........................................................ 429/304
   See application file for complete search history.

(56) References Cited

U.S. PATENT DOCUMENTS

| | | | |
|---|---|---|---|
| 5,498,489 | A | 3/1996 | Dasgupta et al. |
| 6,413,285 | B1 | 7/2002 | Chu et al. |
| 6,815,121 | B2 | 11/2004 | Dasgupta et al. |
| 7,923,156 | B2 | 4/2011 | Dasgupta et al. |
| 8,119,273 | B1 | 2/2012 | Gerald, II et al. |
| 8,697,294 | B1 | 4/2014 | Tsukamoto et al. |
| 8,734,989 | B2 | 5/2014 | Lee et al. |
| 8,778,546 | B2 | 7/2014 | Farmer |
| 9,437,370 | B2 | 9/2016 | Chen et al. |
| 9,761,882 | B2 | 9/2017 | Lopatin et al. |
| 2014/0011100 | A1 | 1/2014 | Lee et al. |
| 2014/0079994 | A1 | 3/2014 | Affinito et al. |
| 2014/0287305 | A1 | 9/2014 | Wachsman et al. |
| 2014/0363744 | A1 | 12/2014 | Vereecken et al. |
| 2015/0111110 | A1 | 4/2015 | Watanabe et al. |
| 2016/0301102 | A1 | 10/2016 | Zhamu et al. |
| 2017/0338522 | A1 * | 11/2017 | Hu ................. H01M 2/1673 |

FOREIGN PATENT DOCUMENTS

| | | | | |
|---|---|---|---|---|
| FR | 3034258 | A1 | 9/2016 | |
| JP | 2009238576 | A | 10/2009 | |
| JP | 4927609 | B2 | 5/2012 | |
| JP | 5246538 | B2 | 7/2013 | |
| JP | 2014192041 | A | 10/2014 | |
| KR | 101561605 | B1 | 10/2015 | |
| WO | WO-2016069749 | A1 * | 5/2016 | .......... H01M 2/1673 |
| WO | 2017116599 | A2 | 7/2017 | |

OTHER PUBLICATIONS

"Thickness." The Merriam-Webster.com Dictionary, Merriam-Webster Inc., https://www.merriam-webster.com/dictionary/thickness. Accessed Dec. 16, 2019. (Year: 2019).*

Cheng, L. et al.,"Effecte of Surface Microstructure on Electrochemical Performance of Garnet Solid Electrolytes", Applied Materials & Interfaces, 2015, 7; pp. 2073-2081.

Dunn, Bruce, "Effect of Air Exposure on the Resistivity of Sodium Beta and Beta Aluminas", Journal of the American Ceramic Society, vol. 64, No. 3, Mar. 1981; pp. 125-128.

Han et al., "Negating Interfacial impedance in garnet-based solid-state Li metal batteries" Nature Materials, vol. 16 (2017); pp. 572-560.

Luo, W. et al,."Transition from Superlithiophobicity to Superlithiophilicity of Garnet Solid-State Electrolyte" J. Am. Chem. Soc. 2016, 138; pp. 12258-12262.

Sharafi, A. et al., "Surface Chemistry Mechanism of Ultra-Low Interfacial Resistance in the Solid-State Electrolyte Li7La3Zr2O12", Chem.Mater DOI 10.1021/acs.chemmater.7b03002; pp. A-H.

Supporting Information for the article by Zhou, Weidong et al., "Plating Dendrite-Free Lithium Anode with a Polymer/Ceramic/Polymer Sandwich Electrolyte", published in J. Am. Chem. Soc. 2016; 138, pp. 9385-9388, pp. S1-S7.

Zhou, Weidong et al., "Plating Dendrite-Free Lithium Anode with a Polymer/Ceramic,Polymer Sandwich Electrolyte", J. Am. Chem. Soc. 2016; 138, pp. 9385-9388.

Sharafi, A. et al., "Surface Chemistry Mechanism of Ultra-Low Interfacial Resistance in the Solid-State Electrolyte Li7La3Zr2O12", Chem. Mater. DOI 10.1021/acs.chemmater.7b03002; Received Jul. 18, 2017; pp. A-H.

Newman, J. et al., "Electrochemical Systems", 3rd edition, John Wiley & Sons, Hoboken, NJ, 2004, eq. 22.25; pp. 528-529.

Han et al., "Negating Interfacial impedance in garnet-based solid-state Li metal batteries" Nature Materials, vol. 16, (May 2017); pp. 572-580.

* cited by examiner side view

SOLID ELECTROLYTE FOR A NEGATIVE ELECTRODE OF A SECONDARY BATTERY INCLUDING FIRST AND SECOND SOLID ELECTROLYTES WITH DIFFERENT AFFINITIES FOR METAL DEPOSITION ELECTRONCHEMICAL CELL AND METHOD OF MANUFACTURING

CROSS REFERENCE TO RELATED APPLICATION

This application claims the benefit, under 35 U.S.C. § 119(e), of U.S. Provisional Patent Application Ser. No. 62/447,005, filed on Jan. 17, 2017, which is incorporated herein by reference in its entirety.

BACKGROUND

There has been an increasing demand for a secondary battery having improved performance for stationary and mobile applications. Batteries with metal negative electrodes are attractive, because they can provide high energy density. Lithium, sodium, and magnesium batteries using a liquid organic electrolyte have been considered, however they present a number of performance and safety issues. Solid-state electrolytes offer improved safety over liquid electrolytes; however, robustness sufficient for commercialization has not yet been demonstrated. In particular, when currently available cells with solid electrolytes are cycled, short-circuits are observed after some number of cycles, believed to be caused by the depositing metal penetrating across the separator, resulting in a loss in performance and potentially unacceptable safety properties.

Therefore, in order to overcome the technical challenges associated with batteries with metal negative electrodes, there remains a need for improved design of solid electrolytes.

SUMMARY

A solid electrolyte for a negative electrode of a secondary battery comprises a first solid electrolyte having a first surface; and a second solid electrolyte on the first solid electrolyte, the second solid electrolyte having a second surface, wherein the first solid electrolyte and the second solid electrolyte each have an ionic conductivity effective for a deposition metal, and wherein the first surface and the second surface are different in composition, structure, or both.

An electrode assembly for an electrochemical cell comprises at least one of a current collector and a separator; and the solid electrolyte of the present disclosure; wherein the solid electrolyte is disposed on the current collector if present, on the separator if present, or between the current collector and the separator if both are present, wherein the first surface of the first solid electrolyte and the second surface of the second solid electrolyte define a void, which extends from the current collector to the separator.

An electrochemical cell comprises a positive electrode; and the electrode assembly of the present disclosure disposed on the positive electrode.

A solid electrolyte for a negative electrode for a secondary battery comprising a first solid electrolyte having a first surface; and a second solid electrolyte on the first solid electrolyte, the second solid electrolyte having a second surface; wherein the first solid electrolyte and the second solid electrolyte each have an ionic conductivity effective for a deposition metal, wherein the first surface and the second surface each independently further comprise a carbonate, a halogen, an oxide, a polymer, an oxide, a silicide, a phosphide, a sulfide, an oxide, a metal of Groups 2 to 16, or a combination thereof, and wherein the first surface and the second surface are different.

An electrochemical cell comprises a positive electrode; a separator disposed adjacent to the positive electrode; negative electrode comprising a first porous solid electrolyte adjacent to the separator and opposite the positive electrode, a second porous solid electrolyte adjacent to the first porous solid electrolyte and opposite the separator, wherein the first porous solid electrolyte and the second porous solid electrolyte define a void which is adjacent the separator; and a current collector disposed on the second porous solid electrolyte and opposite the first porous solid electrolyte, wherein a first surface of the first porous solid electrolyte and a second surface of the second solid electrolyte are different in composition, structure, or both.

A method of manufacturing an electrode assembly includes providing a first composition comprising a solid electrolyte and a solvent; disposing the first composition on a substrate; removing the solvent to form a layer comprising the solid electrolyte; heat-treating the layer in the absence of $CO_2$ and $H_2O$ to provide a porous solid electrolyte layer on the substrate; disposing a surface modifier on a portion of a surface of the porous solid electrolyte to provide a second solid electrolyte layer having a second surface; and contacting the porous solid electrolyte layer with air to form a first solid electrolyte layer adjacent to the substrate, the first solid electrolyte layer comprising a first surface different from the second surface to manufacture the electrode assembly.

A method of manufacturing an electrochemical cell includes disposing a positive electrode on the electrode assembly to provide the electrochemical cell.

The above described and other features are exemplified by the following figures and detailed description.

BRIEF DESCRIPTION OF THE DRAWINGS

The following figures are exemplary embodiments wherein the like elements are numbered alike.

DETAILED DESCRIPTION

Figure 1:
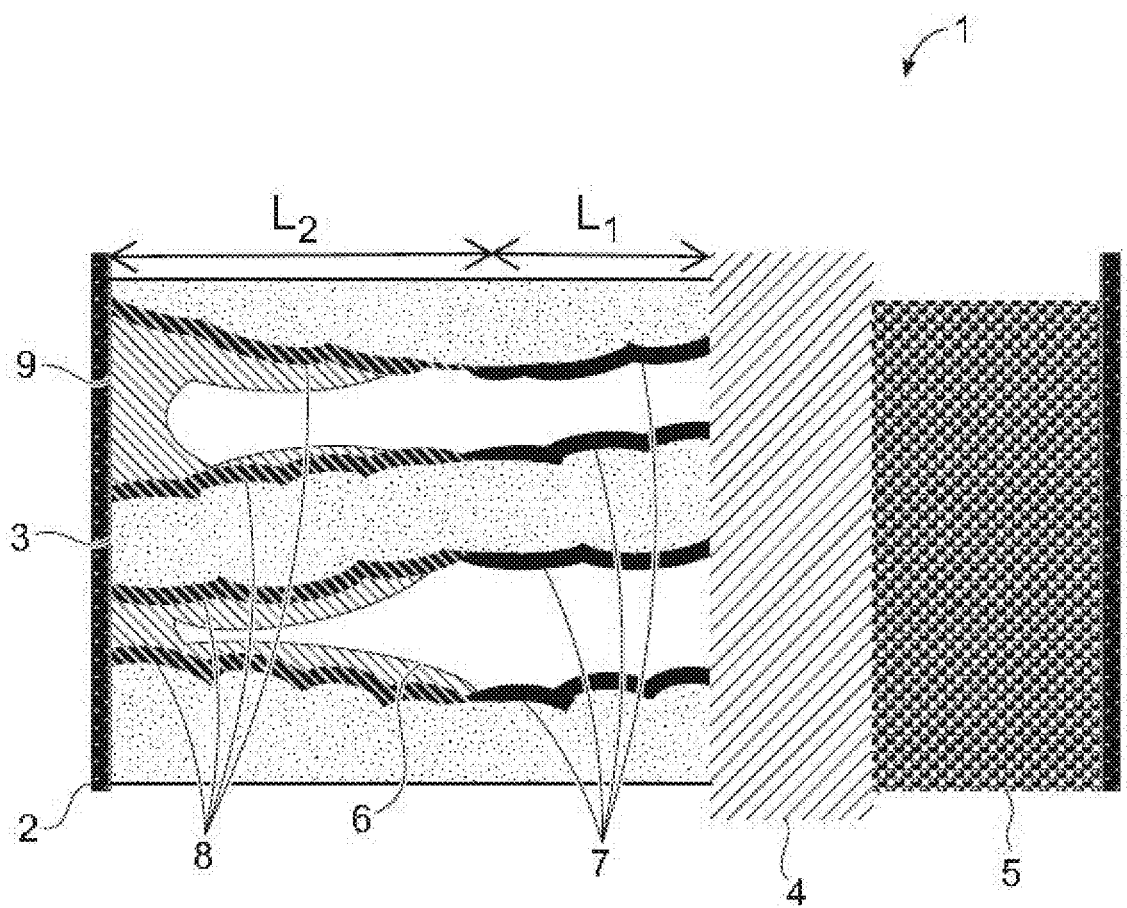
FIG. 1 is a schematic illustration of an embodiment of an electrochemical cell with a porous solid electrolyte, a surface favorable for metal deposition adjacent to the current collector, and a surface unfavorable for deposition adjacent to the separator.

Porous solid electrolytes have been proposed for batteries with metal-deposition negative electrodes. See, e.g., U.S. Pat. No. 4,439,502, which includes examples for sodium-metal batteries, and U.S. Publication No. 2014/0287305, which includes examples for lithium-metal batteries. While not wanting to be bound by theory, as the cell is charged and discharged, the metal deposits into the void space of the porous solid electrolyte. Initially, the metal will preferentially deposit at the interface between the current collector and the solid electrolyte. The deposited metal will then grow along the surface of the solid electrolyte. However, once enough metal has deposited to create a percolating path for electrons, the metal will preferentially deposit close to the separator, because ionic conductivity of the electrolyte is less than the electronic conductivity of the metal. It is further understood that metal deposited adjacent to the separator will cause mechanical stress in the separator, and over time, that stress will cause fatigue of the separator, enabling metal to grow through weak regions of the separator.

In addition, because the metal may not plate at 100% density (e.g., there may be void regions into which the metal does not grow), because there are tolerances in cathode capacity, and because in-plane current gradients cause redistribution of metal in large cells particularly with thermal gradients, the negative electrode desirably has a design margin to accommodate any extra metal in such a way that the extra metal does not cause stress in the separator.

The present inventors have discovered a porous solid electrolyte for use with metal deposition electrodes that can overcome the above-described technical challenges. The present disclosure provides robust protection against internal shorts in batteries by providing an internal buffer region located between a porous metal negative electrode and the separator, where the buffer region includes an ionic conductor and a void space. Preferably, the ionic conductor in the buffer region has a surface that is more poorly wetted by the depositing metal, a higher charge transfer resistance for metal deposition, or is otherwise less favorable for metal deposition than the ionic conductor in the porous negative electrode. Advantageously, by making the deposition of the metal less favorable in a region adjacent the separator than in a region adjacent a current collector, the metal is driven to preferentially deposit proximate to the current collector and away from the separator, thereby avoiding stress on the separator. In contrast, for a porous anolyte without a buffer layer, during charging, the metal will preferentially deposit close to the separator, because the ionic conductivity of the electrolyte is less than the electronic conductivity of the metal. Metal deposited adjacent to the separator will cause mechanical stress in the separator. Over time, that stress will cause fatigue of the separator, enabling the metal to grow through a weak region of the separator. Thus, a significant improvement in the structure of porous solid electrolytes for use with metal deposition negative electrodes is provided by the present disclosure.

Accordingly, an aspect of the present disclosure is a solid electrolyte for a negative electrode of a secondary battery. The solid electrolyte comprises a first solid electrolyte having a first surface and a second solid electrolyte disposed on the first solid electrolyte and having a second surface. The first and second solid electrolytes each have an ionic conductivity effective for a deposition metal. The deposition metal can be lithium (Li), sodium (Na), potassium (K), magnesium (Mg), zinc (Zn), silver (Ag), aluminum (Al), or a combination thereof. In some embodiments, the deposition metal can preferably comprise Li, Na, Mg, or combination thereof. In a specific embodiment, the deposition metal is Li. For example, the first solid electrolyte and the second solid electrolyte can each independently have an ionic conductivity for Li, Na, K, Mg, Zn, Ag, Al, or a combination thereof. The minimum conductivity of the electrolyte for metal deposition depends on the application requirements for energy and power density. In general, the conductivity can be at least $10^{-3}$ S/m, for example, 0.01 to 10 S/m, or 0.1 to 10 S/m (at room temperature, e.g., about 23° C.).

In some embodiments, the first solid electrolyte, the second solid electrolyte, or both are porous. In some embodiments, the first solid electrolyte is porous. In a specific embodiment, the first solid electrolyte and the second solid electrolyte are porous. The porous structure of the electrolyte can refer to an electrolyte having micro- and/or nanostructural features (e.g., microporosity and/or nanoporosity). For example, the porosity of the first solid electrolyte and the second solid electrolyte regions can independently be 10 to 90%, or 20 to 80%, or 30 to 70%, including all intermediate values and ranges. The porosity of the first solid electrolyte and the second solid electrolytes can be the same or different. As used herein, "pores" can also refer to "voids." For example, in some embodiments, the first solid electrolyte and the second solid electrolyte can comprise a void, wherein the void extends through the first solid electrolyte and the second solid electrolyte (for example, when the solid electrolyte is disposed between a current collector and a separator in an electrode assembly, as further described below, the void extends through the first solid electrolyte and the second solid electrolyte from the separator to the collector). The void is defined by the first surface of the first solid electrolyte and the second surface of the second solid electrolyte. In some embodiments, the porosity or voids in the first and second solid electrolytes can be further described in terms of the volume fraction of the electrolyte material present in a given region. For example, the electrolyte can comprise a first region comprising the first solid electrolyte and a second region comprising the second solid electrolyte. The volume fraction of the first solid electrolyte in the first region can be 0.2 to 0.95, based on the total volume of the first region. The volume fraction of the second solid electrolyte in the second region can be 0.1 to 0.5, based on the total volume of the second region.

The first region comprising the first solid electrolyte can have a length $L_1$ and the second region comprising the second solid electrolyte can have a length $L_2$, and the length Li is preferably less than or equal to $L_2$. In some embodiments, a ratio of $L_1:L_2$ can be, for example, 0.01 to 1, or 0.1 to 1.

In some embodiments, the surface area of the first surface can be less than or equal to the surface area of the second surface. For example, the ratio of the surface area of the first surface to the surface area of the second surface can be, for example, 0.01 to 1, or 0.1 to 1. Surface area of the first and second surface can be determined using, for example, scanning electron microscopy (SEM) or nitrogen absorption. Details of such methods, which can be determined without undue experimentation, are not further disclosed for clarity.

The first solid electrolyte and the second solid can each independently comprise a glass, a ceramic, a polymer, or a combination thereof. In some embodiments, the deposition metal is lithium and the first solid electrolyte and the second solid can each independently comprise a lithium ceramic or a glass ceramic. The lithium ceramic or glass ceramic can comprise, for example, a garnet-type oxide. The garnet-type oxide can be of the formula $L_{5+x}E_3(Me_zM_{2-z})O_d$ wherein L is a monovalent cation or a divalent cation, and provided that at least a part of or all of L is Li; E is a trivalent cation; Me and M are each independently one of a trivalent, tetravalent, pentavalent, and a hexavalent cation; $0<x\leq3$, $0\leq z<2$, and $0<d\leq12$; and O can be partially or totally substituted with a pentavalent anion, a hexavalent anion, a heptavalent anion, or a combination thereof. For example, E can be partially substituted with a monovalent or divalent cation. In another embodiment, for example, in the solid ion conductor, when $0<x\leq2.5$, E may be La and M can be Zr.

In some embodiments, the garnet-type oxide can be of the formula $L_{5+x+2y}(D_yE_{3-y})(Me_zM_{2-z})O_d$ wherein L is a monovalent cation or a divalent cation, and provided that at least a part of or all of L is Li; D is a monovalent or divalent cation; E is a trivalent cation; Me and M are each independently a trivalent, tetravalent, pentavalent, or a hexavalent cation; $0<x+2y\leq3$, $0<y\leq0.5$, $0\leq z<2$, and $0<d\leq12$; and O can be partially or totally substituted with a pentavalent anion, a hexavalent anion, a heptavalent anion, or a combination thereof.

The preferred number of moles of lithium per formula unit (Li-pfu) in the above formula is $6<(5+x+2y)<7.2$, $6.2<(5+x+2y)<7$, $6.4<(5+x+2y)<6.8$.

In the garnet-type oxides of the above formulas, D can comprise potassium (K), rubidium (Rb), cesium (Cs), calcium (Ca), barium (Ba), or strontium (Sr). In an embodiment, D is calcium (Ca), barium (Ba), or strontium (Sr). In the above formulas, Me can be a transition metal. For example, Me can be tantalum (Ta), niobium (Nb), yttrium (Y), scandium (Sc), tungsten (W), molybdenum (Mo), antimony (Sb), bismuth (Bi), hafnium (Hf), vanadium (V), germanium (Ge), silicon (Si), aluminum (Al), gallium (Ga), titanium (Ti), cobalt (Co), indium (In), Zinc (Zn), or chromium (Cr). In the above formulas, L can be lithium (Li), sodium (Na), aluminum (Al), gallium (Ga), magnesium (Mg), potassium (K), or hydrogen (H). For example, L can be Li and monovalent and/or divalent ions such as Na, Mg, and the like. In some embodiments, L is Li; D comprises Ca, Ba, Sr, or Rb; and Me is Ta, Ga, Al, W, Nb. In a specific embodiment, the lithium ceramic or glass ceramic can be of the formula $Li_{6.5}La_3Zr_{1.5}Ta_{0.5}O_{12}$.

The lithium ceramic or glass ceramic can also comprise an antiperovskite structure having the general formula $A_3RX$ wherein A is Li or Na; X is Cl, Br, I, or a super halide such as $BH_4$ or $BF_4$; and R is O or S. An exemplary antiperovskite is $Li_3OCl$.

The lithium ceramic or glass ceramic can also comprise a phosphate-type solid electrolyte such as a NASICON structure of the general formula $Li_{1\pm x}M1_xM2_{2-x}(PO_4)_3$, wherein M1 is Al, Ga, In, Sc, Cr, Fe, Ta, or Nb; M2 is Ti, Zr, Hf, Si, or Ge, and wherein the number of moles of lithium per formula unit is $0<x<2$, $0.2<1\pm x<1.8$, $0.4<1\pm x<1.6$. For example, the NASICON structure can be $LiTi_2(PO_4)_3$, $Li_{1+x}Al_xGe_{2-x}(PO_4)_3$ (LAGP), $Li_{1+x}Al_xTi_{2-x}(PO_4)_3$ (LATP), $Li_{1+x}Ti_{2-x}Al_xSi_y(PO_4)_{3-y}$, $Li_{1-x}Ti_{2-x}Ta_x(PO_4)_3$ wherein $0<x<1$ and $0\leq y<1$, $LiAl_xZr_{2-x}(PO_4)_3$, and $LiTi_xZr_{2-x}(PO_4)_3$ wherein $0<x<2$.

The lithium ceramic or glass ceramic can also comprise an oxide-type solid electrolyte such as a perovskite structure having the general formula $(La_{1-x}Li_x)TiO_3$ (LLTO) wherein $0<x<1$.

The lithium ceramic or glass ceramic can also comprise a sulfide or glassy sulfide such as $Li_6PS_5X$ wherein X is Cl, Br, or I, $Li_{10}MP_2S_{12}$ wherein M is Ge, Si, or Sn; $Li_2S$—$P_2S_5$, $Li_2S$—$P_2S_5$—$L_4SiO_4$, $Li_2S$—$Ga_2S_3$—$GeS_2$, $Li_2S$—$Sb_2S_3$—$GeS_2$, $Li_{3.25}$—$Ge_{0.25}$—$P_{0.75}S_4$, or $Li_3PS_4$, $Li_7P_3S_{11}$.

The lithium ceramic or glass ceramic can also comprise $Li_3N$, $Li_2S$, $LiBH_4$, or $Li_3BO_3$, optionally including derivatives with dopants on the cation or anion sites.

Preferably, the first solid electrolyte and the second solid can be a garnet-type oxide, and more preferably, can comprise $Li_7La_3Zr_2O_{12}$. Optionally, any of the foregoing can further comprise one or more dopants, for example selected from Al, Ge, Ga, W, Ta, Nb, Ca, Y, Fe, or a combination thereof, wherein the dopant, if present, is contained in an amount of greater than 0 to 3 moles per formula unit in the unit formula $Li_7La_3Zr_2O_{12}$ on the La-site, and greater than 0 to 2 moles per formula unit on the Zr site.

In some embodiments, the deposition metal can be sodium, and the first solid electrolyte and the second solid can each independently comprise an oxide-type solid electrolyte such as sodium $\beta$-$Al_2O_3$ or NASICON ($Na_{1+x}Zr_2Si_xP_{3-x}O_{12}$, $0<x<3$); a sulfide type (e.g., $Na_3PS_4$); a closo-borate; or a polymer electrolyte such as poly(ethylene oxide) with a dissolved salt such as $NaAsF_6$.

In some embodiments, the deposition metal can be magnesium, and the first solid electrolyte and the second solid electrolyte can each independently comprise an inorganic solid electrolyte such as $MgM_2Z_4$ wherein M is In, Y, or Sc; and Z is S or Se; $Mg_3B_{12}$; or $Mg_{1-2x}Zr_{1-x}Nb_x)_4P_6O_{24}$ wherein $0\leq x\leq 1$.

The bulk composition of the first and second solid electrolytes can be the same or different. As used herein, the term "bulk composition" refers to the overall composition of the first solid electrolyte excluding the first surface or the overall composition of the second solid electrolyte excluding the second surface. In some embodiments, the composition of the first and second solid electrolytes are the same. For example, in a specific embodiment, the first solid electrolyte and the second solid electrolyte can each comprise $Li_7La_3Zr_2O_{12}$ (LLZO). In some embodiments, the first solid electrolyte composition can be selected to form a solid electrolyte interphase that has low ionic conductivity, and the second solid electrolyte can be selected to be thermodynamically stable in the presence of lithium metal, or to form a solid electrolyte interphase that has high ionic conductivity.

In some embodiments, the first solid electrolyte and the second solid electrolyte can have different morphologies. The morphology of the first solid electrolyte and the second solid electrolyte can each independently be fibrillar, columnar, irregular spheroids, or any other morphology which is generally known, and preferably which forms a percolating network (i.e., to provide a porous solid electrolyte). For example, in some embodiments, the second solid electrolyte can be fibrillar or of a morphology having a high surface area, while the first solid electrolyte can have a lower aspect ratio to allow for a higher volume fraction of the first solid electrolyte, effectively reducing transport resistance.

The first and second solid electrolytes comprise a first and second surface, respectively, as discussed above. The first and second surfaces can have a composition that is the same or different as the bulk composition of the first and second solid electrolytes, respectively. In some embodiments, the first surface can have a composition that is different from the bulk composition of the first solid electrolyte, and the second surface can have a composition that is different from the bulk composition of the second solid electrolyte. In some embodiments, the first surface and the second surface can each independently further comprise a carbonate, a halogen, an oxide, a polymer, a silicide, a phosphide, a sulfide, a metal of Groups 2 to 16, or a combination thereof. For simplicity, when the first and second surfaces further comprise the carbonate, the halogen, the oxide, the polymer, the silicide, the phosphide, the sulfide, the metal of Groups 2 to 16, or a combination thereof, the first and second surfaces can be considered to further comprise a coating, where the coating is understood to include the carbonate, the halogen, the oxide, the polymer, the silicide, the phosphide, the sulfide, the metal of Groups 2 to 16, or a combination thereof.

In some embodiments, the first surface, the second surface, or both can further comprise a polymer. The polymer of the first surface is preferably ionically and electronically insulating, stable in the presence of the deposition metal (e.g., lithium) or forms an electronically and ionically insulating and stable passivation layer, and is capable of being applied uniformly over the first surface. For example, the polymer can comprise a polyacetal, a polyolefin, a poly(alkylene oxide), a poly(meth)acrylate, a polycarbonate, a polystyrene, a polyester, a polyamide, a polyamideimide, a polyarylate, a polyarylsulfone, a polyethersulfone, a polyphenylene sulfide, a polyvinyl chloride, a polysulfone, a polyimide, a polyetherimide, a polytetrafluoroethylene, a polyetherketone, a polyether etherketone, a polyether ketone ketone, a polybenzoxazole, a polyphthalide, a polyacetal, a polyanhydride, a polyvinyl ether, a polyvinyl thioether, a polyvinyl alcohol, a polyvinyl ketone, a polyvinyl halide, a polyvinyl nitrile, a polyvinyl ester, a polysulfonate, a polysulfide, a polythioester, a polysulfone, a polysulfonamide, a polyurea, a polyphosphazene, a polysilazane, a polyethylene terephthalate, a polybutylene terephthalate, a polyurethane, an ethylene propylene diene rubber, a polytetrafluoroethylene, a fluorinated ethylene propylene, a perfluoroalkoxyethylene, a polychlorotrifluoroethylene, a polyvinylidene fluoride, or a combination thereof. In some embodiments, the polymer comprises polyethylene, polypropylene, polystyrene, poly(ethylene oxide), poly(methyl methacrylate), poly(imide), or a combination thereof.

In contrast, in some embodiments, the polymer on the second surface is preferably ionically conductive, stable in the presence of the deposition metal or forms an ionically conductive and stable passivation layer, and has low surface energy with the deposition metal. Exemplary polymer can include, but are not limited to, polyethylene oxide doped with a lithium salt, poly(methyl methacrylate) ("PMMA"), polypropylene oxide ("PPO"), polyvinylidene fluoride ("PVdF"), polystyrene ("PS"), polyvinyl chloride ("PVC"), polyvinyl alcohol ("PVA"), polyacrylonitrile ("PAN"), polyester sulfide ("PES"), derivatives thereof, other polymers comprising ion dissociable groups, and the like, or a combination thereof. In some embodiments, the polymer can be a poly(ethylene oxide) doped with a lithium salt, wherein the lithium salt can comprise, for example, $LiN(SO_2CF_2CF_3)_2$, $LiBF_4$, $LiPF_6$, $LiSbF_6$, $LiAsF_6$, $LiClO_4$, $LiCF_3SO_3$, $LiN(SO_2CF_3)_2$, $LiN(SO_2C_2F_5)_2$, $LiC(SO_2CF_3)_3$, $LiN(SO_3CF_3)_2$, $LiC_4F_9SO_3$, $LiAlCl_4$, and the like, or a combination thereof. In some embodiments, the polymer can be a poly(ethylene oxide) doped with a sodium salt, for example, $NaAsF_6$.

In an embodiment, the first surface and the second surface each independently can further comprise a carbonate, a halogen, an oxide, a polymer, or combination thereof. Also, the first surface and the second surface can each independently comprise an oxide, a silicide, a phosphide, a sulfide, an aluminum oxide, magnesium, niobium, gold, silver, calcium, indium, tin, antimony, zinc, a polymer, or a combination thereof.

In some embodiments, the first surface further comprises a carbonate, a halogen, an oxide, a polymer, or combination thereof. For example, the first surface can further comprise lithium carbonate, lithium fluoride, lithium oxide, lanthanum oxide, zirconium oxide, lanthanum zirconium oxide, hafnium oxide, calcium oxide, gadolinium oxide, samarium oxide, yttrium oxide, or combination thereof.

It is desirable for the second surface to have a low surface energy with the deposition metal (e.g., lithium) and with the second solid electrolyte, to be non-reactive towards the second solid electrolyte, and to have a high diffusivity for the deposition metal (e.g., lithium). Thus, in some embodiments, the second surface further comprises an oxide, a silicide, a phosphide, a sulfide, an aluminum oxide, magnesium, niobium, gold, silver, calcium, indium, tin, antimony, zinc, a polymer, or a combination thereof. For example, the second surface can further comprise lithium oxide, lithium silicide, lithium phosphide, lithium sulfide, lithium aluminum oxide, a lithium-magnesium alloy, lithium nitride, a lithium-niobium alloy, a lithium-gold alloy, a lithium-silver alloy, a lithium-aluminum alloy, a lithium-calcium alloy, a lithium-indium alloy, a lithium-tin alloy, a lithium-antimony alloy, a lithium-zinc alloy, or a combination thereof.

The first surface and the second surface are different in composition, structure, or both.

In some embodiments, the amount, e.g., thickness, of any coating disposed on the first surface as described above can be different from the amount of any coating disposed on the second surface. Stated another way, the mass ratio of a coating disposed on the first surface relative to the first solid electrolyte can be different from the mass ratio of a coating disposed on the second surface relative to the second solid electrolyte. In some embodiments, the mass ratio can decrease continuously across the first region comprising the first solid electrolyte, with the mass ratio of this region being the lowest where the first region meets the second region, and being highest at a side of the first region opposite the second region. In an embodiment, the content of the coating is in the form of a gradient which varies in a direction from the separator and to the current collector. In an embodiment, the thickness of the coating is greatest adjacent the separator. Alternatively, the content of the coating can be greatest adjacent the current collector. In some embodiments, the mass ratio of the coating to the electrolyte can change in a stepwise manner from the first region comprising the first electrolyte to the second region comprising the second electrolyte. In some embodiments, the coating may be a product of the reaction of an oxide electrolyte with water and/or carbon dioxide, for example, from exposing the electrolyte surface to humid air to form a metal carbonate, such as $Li_2CO_3$ or $Na_2CO_3$. Metal carbonates have a low conductivity and a high surface energy with the metal. Therefore, it can desirable to have a coating of, for example, $Li_2CO_3$ on the first surface and have no $Li_2CO_3$ on the second surface. However, it can be difficult to avoid all exposure of the second surface to air during fabrication of the second electrolyte and during assembly of the second electrolyte into a battery. Therefore, the second surface may contain trace amounts of metal carbonate. Thus in an embodiment, the first surface and second surface may both contain metal carbonate. The metal carbonate may form a coating of several nanometers thick on the first surface. The metal carbonate may be present in trace patches on the second surface.

In some embodiments, the first surface and the second surface can be the same compositionally, but can be different structurally. For example, in some embodiments the first surface can have a crystal structure that is different from the crystal structure of the second surface. In a specific embodiment, the first surface and the second surface can each comprise LLZO, and the first surface can comprise LLZO having a tetragonal symmetry, and the second surface can comprise LLZO having a cubic symmetry.

The solid electrolyte of the present disclosure can have a thickness in a range of 10 to 1,000 micrometers (μm), preferably in a range of 1 μm to 500 μm, or 10 μm to 100 μm. The solid electrolyte having a thickness within the disclosed range can have improved mechanical strength and flexibility and excellent ion conductivity.

Each of the first and second solid electrolytes can independently further comprise a binder. Examples of suitable binders can include compounds generally used in forming the lithium ion secondary battery, such as polyvinylidene fluoride (PVDF), polypropylene, carboxymethylcellulose (CMC), starch, hydroxypropylcellulose, polyvinylpyrrolidone, polyethylene, ethylene-propylene-diene terpolymer (EPDM), polyvinyl alcohols, styrene butadiene rubber, fluoro rubber, various copolymers thereof, and combinations thereof. For example, the first solid electrolyte and the second solid electrolyte can each independently include PVDF as a binder. Since PVDF has a flexible mechanical property, a thin and flexible electrolyte having excellent ion conductivity can be prepared when it is used in the solid electrolyte. The binder is preferably used in an amount of 0.1 to 50 parts by weight based on 100 parts by weight of the solid electrolyte.

In some embodiments, the first solid electrolyte and the second solid electrolyte can each independently further comprise a conducting agent. The conducting agent is not particularly limited, and can generally be any material so long as it has a suitable conductivity without causing chemical changes in the battery that is to be formed. Examples of the conductive material include graphite such as natural graphite or artificial graphite; carbon blacks such as acetylene black, Denka black, Ketjen black, channel black, lamp black, and thermal black; conductive fibers such as carbon fibers and metallic fibers; conductive metal oxides such as titanium oxide; and metallic powders such as aluminum powder or nickel powder.

In some embodiments, the first solid electrolyte and the second solid electrolyte can each independently further comprise a filler that is electronically and ionically insulating. The filler can impart mechanical robustness to the solid electrolyte. Fillers can include, but are not limited to glass fibers, insulating polymers (e.g., polystyrene and the like), or a combination thereof.

In some embodiments, the first surface has a first surface energy towards the deposition metal and the second surface has a second surface energy towards the deposition metal, and wherein the first surface energy is greater than the second surface energy, the first surface has a first charge transfer resistance for deposition of the deposition metal and the second surface has a second charge transfer resistance for deposition of the deposition metal, and wherein the first charge transfer resistance is greater than the second charge transfer resistance, or both.

For example, in some embodiments, the first surface has as first surface energy towards the deposition metal and the second surface has a second surface energy towards the deposition metal, and wherein the first surface energy is greater than the second surface energy. Surface energy between the deposition metal and the first and second surfaces can be measured by dropping a droplet of molten metal onto a surface and measuring the contact angle between the metal and the surface. Contact angle is related to surface energy through the Young-Laplace equation. See, e.g., Sharafi et al., Chemistry of Materials, 2017, 29(18), 7961, the content of which is incorporated herein by reference in its entirety.

In some embodiments, the first surface has as first charge transfer resistance for deposition of the deposition metal and the second surface has a second charge transfer resistance for deposition of the deposition metal, and the first charge transfer resistance is greater than the second charge transfer resistance. For example, a ratio of the first charge transfer resistance to the second charge transfer resistance is greater than 30:1, e.g., 30:1 to 1000:1, 40:1 to 800:1, or 50:1 to 600:1. Charge transfer resistance can be measured by making a cell containing the following components in the following order: current collector; porous electrolyte with pores containing a given amount of metal; separator; metal foil; and current collector. The charge transfer resistance can be measured by electrochemical impedance spectroscopy (EIS). The charge transfer resistance for the porous, metal-containing electrolyte is equal to $R_{ct}f_{wetted}/(aL)$, where $R_{ct}$ is the charge transfer per interfacial area, $f_{wetted}$ is the fraction of electrolyte surface area that is in contact with the metal (which ranges from 0 to 1; for example, it is equal to about 0.5 if only half of the pore surface area is in contact with the metal), a is the surface area per volume of electrolyte, and L is the thickness of the porous electrolyte. There are several physical phenomena which influence the charge-transfer resistance. There is the reaction-rate constant for the reaction of the ion (from the ion-transporting phase at the surface of the electrolyte) with the electron (from the electron-transporting phase, here the deposited metal), which is quantified by a physical parameter termed the exchange-current density. In some embodiments, the surface of the electrolyte may comprise a coating. In these cases, the charge transfer resistance includes both the exchange-current density and the resistance to transport of the depositing metal through the coating, which is often termed a film resistance or "solid-electrolyte interphase resistance". The film resistance is equal to $T/\kappa_{coating}$, where T is the thickness of the coating and $\kappa_{coating}$ is the conductivity of the depositing metal through the coating. Thus, the charge-transfer resistance can be increased by coating the surface with a material with low conductivity for the depositing metal, and by increasing the thickness of the coating.

In some embodiments, the first surface has both a first surface energy towards the deposition metal, the second surface has a second surface energy towards the deposition metal, and the first surface energy is greater than the second surface energy, and the first surface has a first charge transfer resistance for deposition of the deposition metal, the second surface has a second charge transfer resistance for deposition of the deposition metal, and the first charge transfer resistance is greater than the second charge transfer resistance.

The solid electrolyte can optionally further comprise a current collector disposed on the second solid electrolyte and opposite the first solid electrolyte. The current collector serves to collect electrons by an electrochemical reaction of the active material or to offer electrons required for an electrochemical reaction. The current collector can comprise, for example, copper, nickel, titanium, sintered carbon, stainless steel, or a combination thereof. In some embodiments, the current collector can be surface-treated for example, with carbon, nickel, titanium, or silver. In some embodiments, the current collector can comprise copper, titanium, stainless steel, or a combination thereof. In some embodiments, the current collector can comprise copper or stainless steel that is surface-treated with carbon, nickel, titanium, or silver.

The current collector can be processed to form fine irregularities on the surfaces thereof so as to enhance adhesive strength of the current collector to the solid electrolyte, and can be used in any of various forms including films, sheets, foils, nets, porous structures, foams, and non-woven fabrics.

Figure 2:
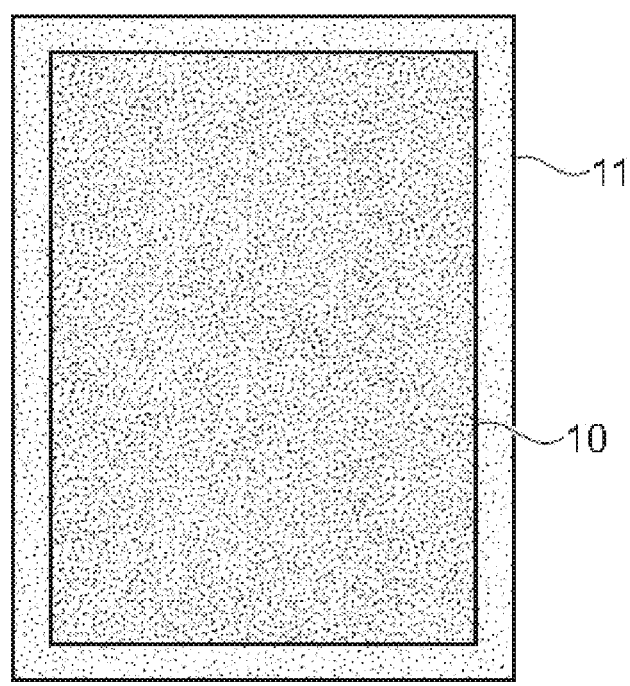
FIG. 2 is a schematic illustration showing an embodiment of an insulation-filled frame to provide mechanical support to prevent cracking of the separator and porous negative electrode where they overhang the cathode.

When considering the design of a battery, there are considerations for how to design the edges of the layers that comprise the battery. The active region of the negative electrode, i.e., the region of the negative electrode that becomes filled with metal during charging, will need to be of smaller length and width than the separator, to ensure there is no shorting around the edges of the separator, particularly at the tabs that make electrical contact to the battery terminals. If the separator comprises a brittle glass or ceramic, unsupported areas can be susceptible to cracking or breaking. In some embodiments, the solid electrolyte can further comprise an insulating frame surrounding one or both of the first and second solid electrolytes. The insulating frame can be non-porous. Preferably, the insulating frame surrounds both the first and the second solid electrolyte. The insulating frame can advantageously provide mechanical strength at the edges of the solid electrolyte. The insulating frame can be as shown in FIG. 2, where the insulating frame 11 surrounds a negative electrode region 10, and can be made, for example, by filling the pores of voids at the periphery of the first and second solid electrolytes with an insulating material (e.g., polyethylene). The width of the frame is between 0.1 and 5 millimeters, or between 0.2 and 3 mm, or between 0.4 and 2 mm.

In a specific embodiment, a solid electrolyte for a negative electrode for a secondary battery can comprise a first solid electrolyte having a first surface, and a second solid electrolyte disposed on the first solid electrolyte, the second solid electrolyte having a second surface. The first solid electrolyte and the second solid electrolyte each have an ionic conductivity effective for a deposition metal. The first surface and the second surface can each independently further comprise a carbonate, a halogen, an oxide, a polymer, an oxide, a silicide, a phosphide, a sulfide, an oxide, a metal of Groups 2 to 16, or a combination thereof, wherein the first surface and the second surface are different. In an embodiment, the Groups 2 to 16 metal it is a metal of Groups 2, a transition metal of Groups 3 to 11, and a metal of Group 12, or a metal of Group 2, a transition metal, and a main group metal. In an embodiment, those metals which do not alloy with lithium, such as Fe, may be excepted.

In a very specific embodiment, electrolyte for a negative electrode for a secondary battery can comprise a first solid electrolyte having a first surface, and a second solid electrolyte disposed on the first solid electrolyte, the second solid electrolyte having a second surface. The first solid electrolyte and the second solid electrolyte each have an ionic conductivity effective for a deposition metal. The first surface and the second surface each comprise a carbonate, wherein the carbonate is present on the first surface in a first amount and the carbonate is present on the second surface in a second amount, wherein the first amount is greater than the second amount. Stated another way, the mass ratio of a coating comprising the carbonate disposed on the first surface relative to the first solid electrolyte can be greater that the mass ratio of a coating comprising the carbonate disposed on the second surface relative to the second solid electrolyte. Preferably, the mass ratio of the coating comprising the carbonate disposed on the first surface relative to the first solid electrolyte can decrease continuously across the first region comprising the first solid electrolyte, with the mass ratio of this region being the lowed where the first region meets the second region, and being highest at a side of the first region opposite the second region. Preferably, the carbonate can be the product of the reaction of an oxide electrolyte with water and/or carbon dioxide, for example, from exposing the electrolyte surface to humid air to form a metal carbonate, such as $Li_2CO_3$ or $Na_2CO_3$. The metal carbonate can form a coating of several nanometers thick on the first surface. The metal carbonate can be present in trace patches on the second surface.

The solid electrolyte of the present disclosure can be particularly useful in an electrode assembly for an electrochemical cell. The electrode assembly can comprise a current collector, a separator, or both, and the solid electrolyte described herein. When the electrode assembly comprises the current collector and the solid electrolyte, the solid electrolyte is disposed on the current collector such that the second solid electrolyte is adjacent to the current collector (i.e., the current collector is disposed on the second solid electrolyte on a side opposite the first solid electrolyte). When the electrode assembly comprises the separator and the solid electrolyte, the solid electrolyte is disposed on the separator such that the first solid electrolyte is adjacent to the separator (i.e., the separator is disposed on the first solid electrolyte on a side opposite the second solid electrolyte). When the electrode assembly comprises the current collector, the separator, and the solid electrolyte, the solid electrolyte is disposed between the current collector and the separator, wherein the separator is adjacent to the first solid electrolyte, and the current collector is adjacent to the second solid electrolyte. The first surface of the first solid electrolyte and the second surface of the second solid electrolyte define a void (or a pore) which extends through the solid electrolyte, preferably from the current collector to the separator.

The current collector, when present, can be as described above. In a specific embodiment, the current collector comprises copper.

Important characteristics of a separator relating to performance of a battery are ionic-conductivity, thermal resistance, resistance to thermal deformation, chemical resistance, mechanical strength, cross-sectional porosity (representing a percentage of the area of pores in a particular cross-section of the separator), wettability for an electrolyte, and the like. As the separator, a porous olefin film such as polyethylene and polypropylene, and an electrolyte can be used. For example, the separator can comprise polyethylene, polypropylene, polyvinylidene fluoride, or a mixed multilayer of two or more layers such as a polyethylene/polypropylene double layered separator, a polyethylene/polypropylene/polyethylene triple layered separator, a polypropylene/polyethylene/polypropylene triple layered separator, and the like. In some embodiments, the separator can comprise a lithium ceramic or a glass ceramic, as described above for the first and second solid electrolytes. The separator can be porous, and a diameter of a pore of the separator can be in a range of about 0.01 micrometer (μm) to about 10 μm, and a thickness of the separator can be in a range of about 5 μm to about 300 μm. In some embodiments, the separator can be a woven or a non-woven fabric comprising an olefin-based polymer such as polypropylene or polyethylene; or a glass fiber.

In some embodiments, the separator can have a composition that is the same as the bulk composition of the first solid electrolyte. Thus, in some embodiments, the separator comprises a lithium ceramic or a glass ceramic as described above. In a specific embodiment, the separator can comprise $Li_7La_3Zr_2O_{12}$. In some embodiments, the separator can have the same composition as both the first solid electrolyte and the second solid electrolyte.

The separator can have a porosity that is the same or different from that of the solid electrolyte. For example, the separator can have a porosity that is less than the porosity of the solid electrolyte, for example a porosity of 1 to 50%, or 1 to 40%, or 1 to 30%, or 1 to 20%, or 1 to 10%, or 1 to 5%. In some embodiments, the separator can be nonporous (i.e., having a porosity of 0%). In a specific embodiment, the separator can have a porosity of 0 to 5%.

The electrode assembly can be prepared according to a variety of methods. For example, a method of making the electrode assembly can include providing a first composition comprising the first solid electrolyte and a first solvent; providing a second composition comprising the second solid electrolyte and a second solvent; disposing the first composition on a substrate (e.g., a separator material) to form a first layer comprising the first solid electrolyte; disposing the second composition on the first layer to form a second layer comprising the second solid electrolyte; and heat-treating the first layer and the second layer to remove the first solvent and the second solvent and manufacture the electrolyte. Heat-treating can include drying, curing, sintering, or a combination thereof. Coating of the layers can be done in a single-pass process using a cascade coater or similar process. Alternatively, there can be multiple coating steps, including coating of the first layer, surface treatment of the first layer, coating of the second layer, surface treatment of the second layer, or a combination thereof. When desired, surface treatment of the electrolyte material can be done prior to coating. In some embodiments, the method can further include disposing the above assembly comprising the first layer, the second layer, and the substrate on a current collector to provide the electrode assembly.

Alternatively, the first composition comprising the first solid electrolyte and the first solvent can be disposed onto the substrate (e.g., the separator) to form the first layer, and the second composition comprising the second solid electrolyte and the second solvent can be disposed onto a current collector to form the second layer. The layers can be laminated together to provide the electrode assembly.

In a specific embodiment, the electrode assembly can be prepared according to a method comprising providing a first composition comprising a solid electrolyte and a solvent and optionally, a binder and a pore-former; disposing the first composition on a substrate; removing solvent to form a layer comprising the solid electrolyte (e.g., by drying the layer); heat-treating the layer, preferably in the absence of carbon dioxide ($CO_2$) and water ($H_2O$), and more preferably in the presence of an $O_2/N_2$ gas mixture to remove binder and pore-former, when present, and partially sintering the solid electrolyte to provide a porous solid electrolyte layer on the substrate. The porous solid electrolyte layer can have a pre-selected pore size and porosity (%). The method further comprises disposing a surface modifier (also referred to herein as a coating) on a portion of a surface of the porous solid electrolyte to provide a second solid electrolyte layer having a second surface; and contacting the porous solid electrolyte layer with air to form a first solid electrolyte layer adjacent to the substrate, the first solid electrolyte layer comprising a first surface different from the second surface to manufacture the electrode assembly. The surface modifier can comprise, for example, a carbonate, a halogen, an oxide, a polymer, an oxide, a silicide, a phosphide, a sulfide, an oxide, a metal of Groups 2 to 16, or a combination thereof. The method can further comprise disposing a current collector on the electrode assembly. The current collector can be disposed on the second solid electrolyte layer of the electrode assembly, and can be as described above.

In the above methods, the solvents can be any solvent capable of forming the desired composition, which can be in the form of a homogenous solution or a slurry. For example, the solvent can be an organic solvent comprising methanol, ethanol, propanol, butanol, toluene, xylene, acetone, cyclohexanone, trichloroethylene, and the like, or combination thereof.

In the above methods, the binder can be, for example, polyvinyl butyral (PVB), polyvinyl pyrrolidone (PVP), polyethyleneimine (PEI), polyethylene glycol (PEG), polyacrylic acid (PAA), a methacrylate polymer or co-polymer, or a combination thereof.

In the above methods, the pore-former can be any material that has uniform particle size, and can be removed completely by firing, for example, starches, graphite powder, polyethylene, and the like, or a combination thereof. A dispersant can also optionally be included.

Another aspect of the present disclosure is an electrochemical cell. The electrochemical cell can comprise a positive electrode and the above-described electrode assembly. The electrochemical cell can have any suitable shape, can be prismatic or cylindrical, and can be fabricated in a shape such as a cylinder, a prism, a disk, or a sheet. The shape of the electrochemical cell is not limited to the above mentioned shapes, and can be shaped in various forms other than the foregoing.

In some embodiments, the electrochemical cell can further comprise the deposition metal disposed on the current collector, the first surface of the first solid electrolyte, the second surface of the second solid electrolyte, or a combination thereof. In some embodiments, the electrochemical cell can further comprise the deposition metal disposed on the current collector, the second surface of the second solid electrolyte, or a combination thereof and the first surface of the first solid electrolyte can be substantially free of the deposition metal. As used herein, the first surface of the first solid electrolyte being "substantially free" of the deposition metal can refer to an amount of the deposition metal on the first surface being less than or equal to 25%, or less than or equal to 20%, or less than or equal to 10%, or less than or equal to 5%, or less than or equal to 1%, of the total amount of the deposition metal. In some embodiment, the portion of the void adjacent to the separator and defined by the first surface of the first solid electrolyte can be substantially free of the deposition metal. For example, the deposition metal in the portion of the void adjacent to the separator and defined by the first surface of the first solid electrolyte can be present such that it occupies less than or equal to 80%, or less than or equal to 50%, or less than or equal to 20%, or less than or equal to 10%, or less than or equal to 5%, of the area-average void space adjacent to the separator. Preferably, the amount of deposition metal disposed on the first surface is less than an amount of the deposition metal disposed on the second surface. Similarly, an amount of the deposition metal disposed in the portion of the void adjacent to the separator and defined by the first surface (i.e., in the "first region", also referred to as the "buffer region") can be less than an amount of the deposition metal in the portion of the void defined by the second surface (i.e., in the "second region", also referred to as the "negative electrode region" or "anode region"). In an embodiment, at least a portion of the void adjacent to the separation and defined by the first surface of the first solid electrolyte is substantially free of the deposition metal at all states of charge of the electrochemical cell.

In some embodiments, all of the deposition metal in the cell originates from the positive-electrode material, and is deposited into the negative electrode when the cell is charged. In other embodiments, some amount of the deposition metal will be included in the electrode assembly prior to cell assembly. The deposition metal can be included as a layer of porous or nonporous metal foil disposed between the current collector and the second electrolyte. The deposition metal can be deposited into the pores of the second electrolyte by various sputtering techniques such as RF-assisted sputtering or RF magnetron sputtering, chemical vapor deposition (CVD), chemical solution deposition (CSD), electrostatic spray deposition (ESD), vacuum thermal vapor deposition (VD), plasma/laser assisted deposition techniques, electrochemical deposition prior to assembly with the positive electrode, and the like.

An exemplary electrochemical cell according to the present disclosure can be as shown in FIG. 1. The electrochemical cell 1 shown in FIG. 1 includes a current collector 2, a solid electrolyte 3, a separator 4, and a cathode 5. The solid electrolyte 3 includes a buffer region $L_1$ comprising the first solid electrolyte (also referred to herein as the first region) sized to allow for a volume of metal (e.g., lithium, sodium, magnesium, and the like) to deposit, accommodating any extra metal volume that may be needed for metal plating at low density, tolerances in cathode capacity, in-plane metal redistribution over the course of cycling, or other tolerances. The buffer region $L_1$ is positioned between the separator 4 and a negative electrode region $L_2$ of the solid electrolyte, wherein the negative electrode region comprises the second solid electrolyte (also referred to herein as the second region). The first surface 7 of the first solid electrolyte in the buffer region is unfavorable for metal deposition. The second surface 8 of the second solid electrolyte in the negative electrode region is favorable for metal deposition. The deposited metal, which preferentially deposits on the second surface is labelled 9 in FIG. 1. By making deposition of metal less favorable in the buffer region $L_1$ than in the negative electrode region $L_2$, the metal can be driven to deposit preferentially in the negative electrode region, thereby avoiding stress on the separator, as the void adjacent to the separator remains substantially free of deposition metal.

Advantageously, deposited metal will charge into/discharge from the pores of the negative electrode region over most conditions of operation, without substantial filling of the pores in the buffer region, even at a state of full charge of the electrochemical cell.

This can be accomplished by the first surface having high surface energy towards the deposition metal, a low surface area, and/or a surface with high charge-transfer resistance. Such a surface may be achieved through selection of the electrolyte and/or by inclusion of a surface coating. In contrast, the second surface of the electrolyte in the negative electrode region is favorable for metal deposition. This can be accomplished by the second surface having low surface energy towards the deposited metal, a high surface area, and/or a low charge-transfer resistance. Such a surface may be achieved through selection of the electrolyte and/or by a surface coating. During charge, metal will deposit into the void space of the negative electrode region, and some may grow into some of the void space of the buffer region. In the fully charged state, unfilled void space, labelled 6 in FIG. 1, will remain in the buffer region (i.e., the region defined by length $L_1$ in FIG. 1, adjacent to the separator 4).

In a very specific embodiment, an electrochemical cell according to the present disclosure can comprise a positive electrode, a separator disposed adjacent to the positive electrode, a negative electrode, and a current collector disposed on the second porous solid electrolyte and opposite the first porous solid electrolyte. The negative electrode comprises a first porous solid electrolyte adjacent to the separator and opposite the positive electrode, and a second porous solid electrolyte adjacent to the first porous solid electrolyte and opposite the separator. The first porous solid electrolyte and the second porous solid electrolyte define a void which is adjacent the separator, and preferably extends from the separator to the current collector. A first surface of the first porous solid electrolyte and a second surface of the second solid electrolyte are different in composition, structure, or both. In some embodiments, the surface of the first porous solid electrolyte has a greater surface energy towards a deposition metal than a surface energy of the second porous solid electrolyte, or a greater charge transfer resistance for the deposition metal than a charge transfer resistance for deposition metal of the second porous solid electrolyte. In some embodiments, the electrochemical cell further comprises a deposition metal, wherein the deposition metal is disposed on the surface of the second porous solid electrolyte.

The positive electrode can be prepared by forming a positive active material layer including a positive active material on a current collector. The positive active material layer may be prepared using a vapor-state method or a solid state method. Examples of the vapor-state method include pulse laser deposition ("PLD"), sputtering deposition, and chemical vapor deposition ("CVD"). However, the vapor state method is not limited thereto, and any suitable vaporization method known in the art may be used. Examples of the solid-state method include a sintering method, a sol-gel method, a doctor-blade method, screen printing, slurry casting, and powder compression. However, the solid-state method is not limited thereto, and any suitable solid-state method known in the art may be used.

The deposition metal can be lithium, and the positive active material can be any of various suitable materials that are used in lithium batteries. For example, the positive active material can be a lithium transition metal oxide, a transition metal sulfide, or the like. For example, the positive active material can include a composite oxide of lithium and a metal selected from cobalt, manganese, and nickel. For example, the positive active material can be a compound represented by any of the Formulas: $Li_aA_{1-b}M_bD_2$ wherein $0.90 \leq a \leq 1.8$ and $0 \leq b \leq 0.5$; $Li_aE_{1-b}M_bO_{2-c}D_c$ wherein $0.90 \leq a \leq 1.8$, $0 \leq b \leq 0.5$, and $0 \leq c \leq 0.05$; $LiE_{2-b}M_bO_{4-c}D_c$ wherein $0 \leq b \leq 0.5$ and $0 \leq c \leq 0.05$; $Li_aNi_{1-b-c}Co_bM_cD_\alpha$ wherein $0.90 \leq a \leq 1.8$, $0 \leq b \leq 0.5$, $0 \leq c \leq 0.05$, and $0 < \alpha \leq 2$; $Li_aNi_{1-b-c}Co_bM_cO_{2-\alpha}X_\alpha$ wherein $0.90 \leq a \leq 1.8$, $0 \leq b \leq 0.5$, $0 \leq c \leq 0.05$, and $0 < \alpha < 2$; $Li_aNi_{1-b-c}CO_bM_cO_{2-\alpha}X_2$ wherein $0.90 \leq a \leq 1.8$, $0 \leq b \leq 0.5$, $0 \leq c \leq 0.05$, and $0 < \alpha < 2$; $Li_aNi_{1-b-c}Mn_bM_cD_\alpha$ wherein $0.90 \leq a \leq 1.8$, $0 \leq b \leq 0.5$, $0 \leq c \leq 0.05$, and $0 < \alpha \leq 2$; $Li_aNi_{1-b-c}Mn_bM_cO_{2-\alpha}X_\alpha$ wherein $0.90 \leq a \leq 1.8$, $0 \leq b \leq 0.5$, $0 \leq c \leq 0.05$, and $0 < \alpha < 2$; $Li_aNi_{1-b-c}Mn_bM_cO_{2-\alpha}X_2$ wherein $0.90 \leq a \leq 1.8$, $0 \leq b \leq 0.5$, $0 \leq c \leq 0.05$, and $0 < \alpha < 2$; $Li_aNi_bE_cG_dO_2$ wherein $0.90 \leq a \leq 1.8$, $0 \leq b \leq 0.9$, $0 \leq c \leq 0.5$, and $0.001 \leq d \leq 0.1$; $Li_aNi_bCo_cMn_dGeO_2$ wherein $0.90 \leq a \leq 1.8$, $0 \leq b \leq 0.9$, $0 \leq c \leq 0.5$, $0 \leq d \leq 0.5$, and $0.001 \leq e \leq 0.1$; $Li_aNiG_bO_2$ wherein $0.90 \leq a \leq 1.8$ and $0.001 \leq b \leq 0.1$; $Li_aCoG_bO_2$ wherein $0.90 \leq a \leq 1.8$ and $0.001 \leq b \leq 0.1$; $Li_aMnG_bO_2$ where $0.90 \leq a \leq 1.8$ and $0.001 \leq b \leq 0.1$; $Li_aMn_2G_bO_4$ wherein $0.90 \leq a \leq 1.8$ and $0.001 \leq b \leq 0.1$; $QO_2$; $QS_2$; $LiQS_2$; $V_2O_5$; $LiV_2O_2$; $LiRO_2$; $LiNiVO_4$; $Li_{(3-f)}J_2(PO_4)_3$ ($0 \leq f \leq 2$); $Li_{(3-f)}Fe_2(PO_4)_3$ wherein $0 \leq f \leq 2$; and $LiFePO_4$, in which in the foregoing positive active materials A is Ni, Co, or Mn; M is Al, Ni, Co, Mn, Cr, Fe, Mg, Sr, V, or a rare-earth element; D is O, F, S, or P; E is Co or Mn; X is F, S, or P; G is Al, Cr, Mn, Fe, Mg, La, Ce, Sr, or V; Q is Ti, Mo or Mn; R is Cr, V, Fe, Sc, or Y; and J is V, Cr, Mn, Co, Ni, or Cu. Examples of the positive active material include $LiCoO_2$, $LiMn_xO_{2x}$ where x=1 or 2, $LiNi_{1-x}Mn_xO_{2x}$ where $0<x<1$, $LiNi_{1-x-y}Co_xMn_yO_2$ where $0 \leq x \leq 0.5$ and $0 \leq y \leq 0.5$, $LiFePO_4$, $TiS_2$, $FeS_2$, $TiS_3$, and $FeS_3$.

In some embodiments, the deposition metal can be sodium, and the positive active material can be any of various suitable materials that are used in sodium batteries. For example, the positive active material can be a compound in which sodium intercalation reversibly occurs, such as an oxide of the formula $NaM1_aO_2$ (e.g., $NaFeO_2$, $NaMnO_2$, $NaNiO_2$, or $NaCoO_2$); or an oxide represented by the formula $NaMn_{1-a}M1_aO_2$, wherein M1 is at least one transition metal element, and $0 \leq a < 1$. Representative positive active materials include $Na[Ni_{1/2}Mn_{1/2}]O_2$, $Na_{2/3}[Fe_{1/2}Mn_{1/2}]O_2$, and the like; an oxide represented by Na.44Mn-$aM1_aO_2$, an oxide represented by $Na_{0.7}Mn_{1-a}M1_aO_{2.05}$ (wherein M1 is at least one transition metal element, and $0 \leq a < 1$); an oxide represented by $Na_bM2_cSi_{12}O_{30}$ as $Na_6Fe_2Si_{12}O_{30}$ or $Na_2Fe_5Si_{12}O$ (wherein M2 is at least one transition metal element, $2 \leq b \leq 6$, and $2 \leq c \leq 5$); an oxide represented by $Na_dM3_eSi_6O_{18}$ such as $Na_2Fe_2Si_6O_{18}$ or $Na_2MnFeSi_6O_{18}$ (wherein M3 is at least one transition metal element, $3 \leq d \leq 6$, and $1 \leq e \leq 2$); an oxide represented by $Na_fM4_gSi_2O_6$ such as $Na_2FeSiO_6$ (wherein M4 is at least one element selected from transition metal elements, magnesium (Mg) and aluminum (Al), $1 \leq f \leq 2$, and $1 \leq g \leq 2$); a phosphate such as $NaFePO_4$, $Na_3Fe_2(PO_4)_3$, $Na_3V_2(PO_4)_3$, $Na_4Co_3(PO_4)_2P_2O_7$ and the like; a borate such as $NaFeBO_4$ or $Na_3Fe_2(BO_4)_3$; a fluoride represented by $Na_hM5F_6$ such as $Na_3FeF_6$ or $Na_2MnF_6$ (wherein M5 is at least one transition metal element, and $2 \leq h \leq 3$), a fluorophosphate such as $Na_3V_2(PO_4)_2F_3$, $Na_3V_2(PO_4)_2FO_2$ and the like. The positive active material is not limited to the foregoing and any suitable positive active material that is used in the art can be used. In an embodiment, the positive active material preferably comprises a layered-type oxide cathode material such as $NaMnO_2$, $Na[Ni_{1/2}Mn_{1/2}]O_2$ and $Na_{2/3}[Fe_{1/2}Mn_{1/2}]O_2$, a phosphate cathode such as $Na_3V_2(PO_4)_3$ and $Na_4Co_3(PO_4)_2P_2O_7$, or a fluorophosphate cathode such as $Na_3V_2(PO_4)_2F_3$ and $Na_3V_2(PO_4)_2FO_2$. A combination comprising at least one of the foregoing positive active materials can be used.

In some embodiments, the deposition metal can be magnesium, and the positive active material can be any of various suitable materials that are used in magnesium batteries. For example, the positive active material can be $TiS_2$, $Mo_6S_{8-y}Se_y$, wherein $0 \leq y \leq 2$, $V_2O_5$, $MnO_2$, $MoS_2$, $WSe_2$, and the like.

In addition, the positive active material layer may further include a conductive agent and a binder. Any suitable conductive agent and binder used in the art may be used.

A binder for the positive electrode can facilitate adherence between components of the positive electrode, such as the positive active material and the conductor, and adherence of the positive electrode to a current collector. Examples of the binder can include polyacrylic acid (PAA), polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene monomer (EPDM), sulfonated EPDM, styrene-butadiene-rubber, fluorinated rubber, a copolymer thereof, or a combination thereof. The amount of the binder can be in a range of about 1 part by weight to about 10 parts by weight, for example, in a range of about 2 parts by weight to about 7 parts by weight, based on a total weight of the positive active material. When the amount of the binder is in the range above, e.g., about 1 part by weight to about 10 parts by weight, the adherence of the positive electrode to the current collector may be suitably strong.

The conductive agent can include, for example, carbon black, carbon fiber, graphite, carbon nanotubes, graphene, or a combination thereof. The carbon black can be, for example, acetylene black, Ketjen black, Super P carbon, channel black, furnace black, lamp black, thermal black, or a combination thereof. The graphite can be a natural graphite or an artificial graphite. A combination comprising at least one of the foregoing conductive agents can be used. The positive electrode can additionally include an additional conductor other than the carbonaceous conductor described above. The additional conductor can be an electrically conductive fiber, such as a metal fiber; a metal powder such as a fluorinated carbon powder, an aluminum powder, or a nickel powder; a conductive whisker such as a zinc oxide or a potassium titanate; or a polyphenylene derivative. A combination comprising at least one of the foregoing additional conductors can be used.

The positive electrode can further comprise an electrolyte. When present, the electrolyte can comprise one or more salts dissolved in one or more solvents, ionic liquid, gel, ionogel, highly concentrated, or a solid. In some embodiments, the electrolyte of the positive electrode can be a solid electrolyte and can comprise a ceramic, glass ceramic, or polymer. The solid electrolyte can be of the same composition as the electrolyte in the separator, or it can be selected to be more electrochemically stable with the positive active material.

The electrochemical cell can be made by a method comprising disposing a positive electrode on the electrode assembly of the present disclosure to provide the electrochemical cell.

This disclosure is further illustrated by the following examples, which are non-limiting.

EXAMPLES

Example 1: Fabrication $Li_7La_3Zr_2O_{12}$ (LLZO) electrolyte is a suitable candidate for the solid electrolyte having negative electrode and buffer regions because its surface can be modified to strongly affect the favorability for lithium deposition. The bare surface of LLZO has a high surface energy with lithium metal. Furthermore, LLZO exposed to water and carbon dioxide under ambient conditions forms a surface coating of $Li_2CO_3$ which increases the charge-transfer resistance as high as 2 $\Omega \cdot m^2$. Such a highly resistive surface can be advantageous for the buffer region. Conversely, coating the surface, such as with $Al_2O_3$, greatly reduces the surface energy and reduces the charge-transfer resistance as low as 0.003 $\Omega \cdot m^2$ (see, e.g., Han et al., Nature Materials 2017 vol. 16 p. 572; Cheng et al., ACS Appl. Mater. Interfaces 2015 vol. 7 p. 17649, the contents of both of which are included herein by reference in their entirety).

A slurry of LLZO is coated onto a dense LLZO pellet and the carrier solvent is evaporated, to leave behind a porous layer of LLZO on top of the dense layer, which is sintered and then annealed in $CO_2$-free and $H_2O$-free air. Si is sputtered onto the surface of the porous layer, coating the surface over a penetration depth of a few microns to create the negative electrode region. Finally, the sample is exposed to ambient air, forming $Li_2CO_3$ on the surface of the buffer region. A copper foil current collector is pressed against the porous negative electrode. The copper foil may comprise a coating to improve electrical contact, such as amorphous carbon.

An exemplary composition of a slurry comprising LLZO for forming the solid electrolyte is provided in Table 1.

TABLE 1

| Component | Description | Amount (grams) |
| --- | --- | --- |
| Electrolyte | Li-garnet powder (LLZO) $D_{50}$ 0.7 μm | 100 |
| Dispersant | Glyceryl Trioleate | 2.53 |
| Solvent | n-Propyl propionate | 151 |
| Binder | Elvacite E-2046 (acrylic resin) | 19 |
| Pore former | Graphite ($D_{50}$ 1.5 μm) | 30 |

Figure 3:
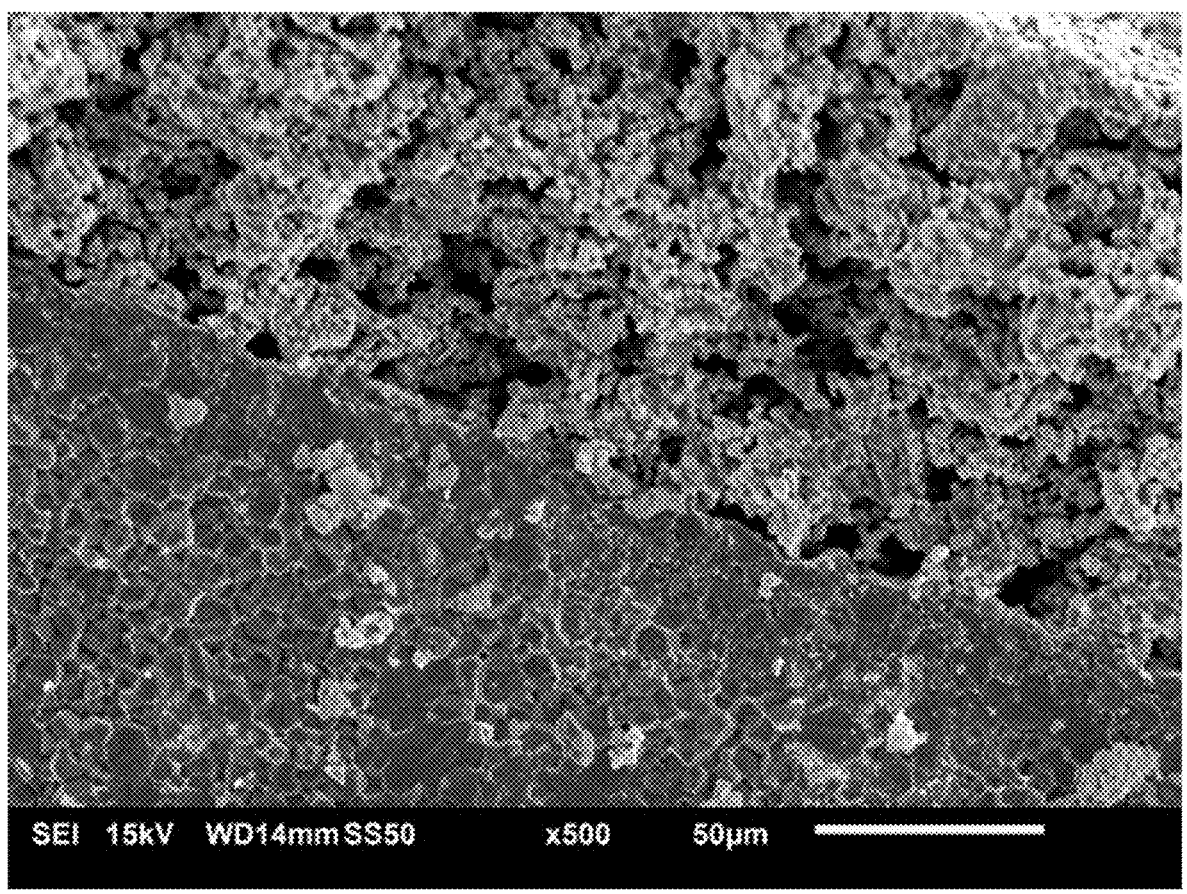
FIG. 3 is a scanning electron microscope (SEM) image of a porous garnet coating of 120 micrometer thickness on a dense garnet membrane.
Figure 4:
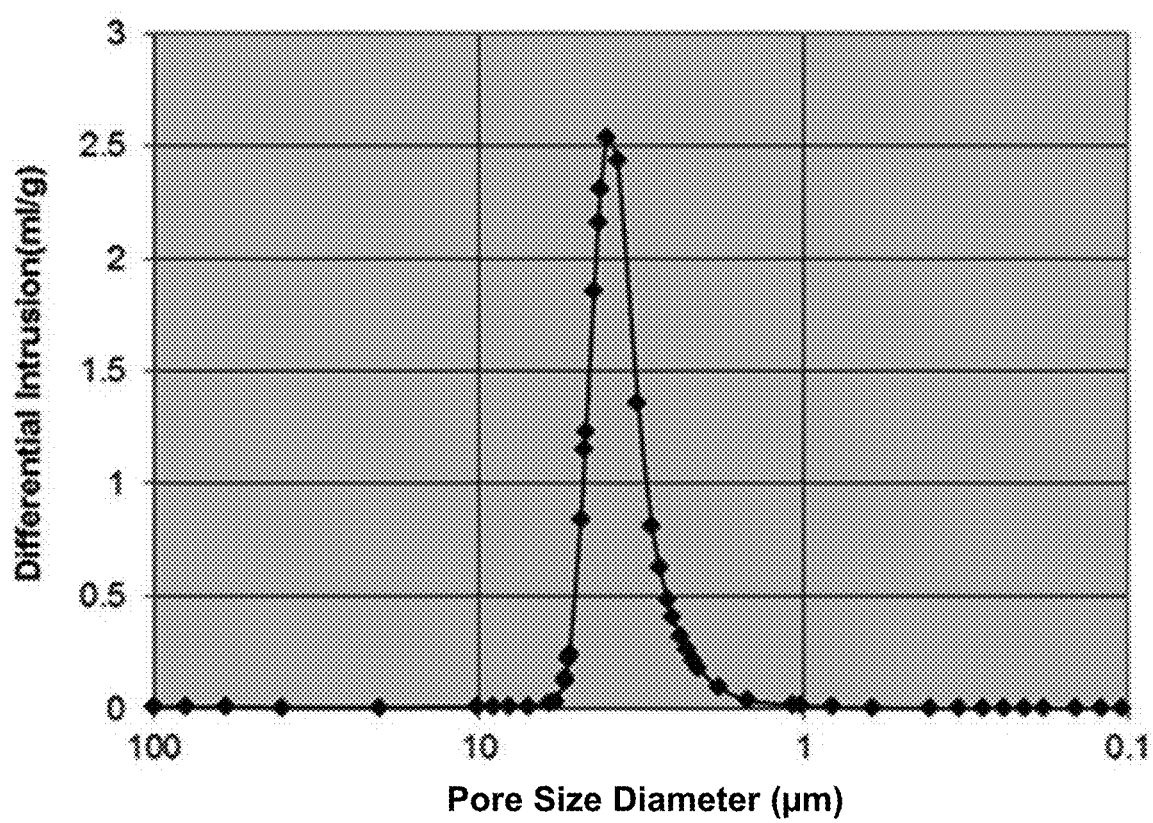
FIG. 4 shows pore size distribution of a porous layer measured by Hg porosimetry.

A slurry was prepared from the Table 1 components, and the slurry was used to form a coating on a garnet membrane (i.e., dense LLZO pellet) by dipping the pellet in the slurry. Multiple dips are contemplated for making a thicker coating, if desired. After coating, the sample is dried, and then fired in a 25% oxygen/75% nitrogen mixture at 900° C. for one hour. FIG. 3 shows a scanning electron microscope (SEM) image of a 120 micrometer-thick porous garnet coating on a dense garnet membrane made by dipping the membrane twice into the slurry, followed by drying and firing. FIG. 4 shows the pore size distribution of the porous layer measured by Hg porosimetry. The measurement indicates the pore size $D_{50}$ at 3. μm, and the porosity at 71%.

Example 2: Characterization

A macrohomogeneous model based on Newman's porous electrode theory was used to simulate the design prepared according to the description of Example 1. The 1-D model includes Ohm's law for ionic conduction in the electrolyte and for electronic conduction in the lithium metal, Butler-Volmer kinetics with an SEI film resistance, conservation of charge, mass balance to calculate the volume fraction of lithium metal within the porous electrode, and mass balance for salt concentration in the electrolyte. Key parameters are the charge-transfer resistances, $R_{ct,a}$ and $R_{ct,b}$, in the negative electrode and buffer regions, respectively. Parameters used in the simulation are: bulk electrolyte conductivity κ 0.1 S/m, transference number 1.0, negative electrode region thickness $L_a$ 20 microns, buffer layer thickness $L_b$ 5 microns, separator thickness 30 microns, negative electrode region electrolyte volume fraction 30%, buffer region electrolyte volume fraction 25%, electrolyte surface area per volume a 5250 $cm^2/cm^3$, and effective electronic conductivity $\sigma_{eff} = 10^7$ S/m*$\varepsilon_{Li}^{1.5}$ where $\varepsilon_{Li}$ is the volume fraction of lithium metal (which changes with time). Initially there is no lithium metal in the negative electrode.

Figure 5:
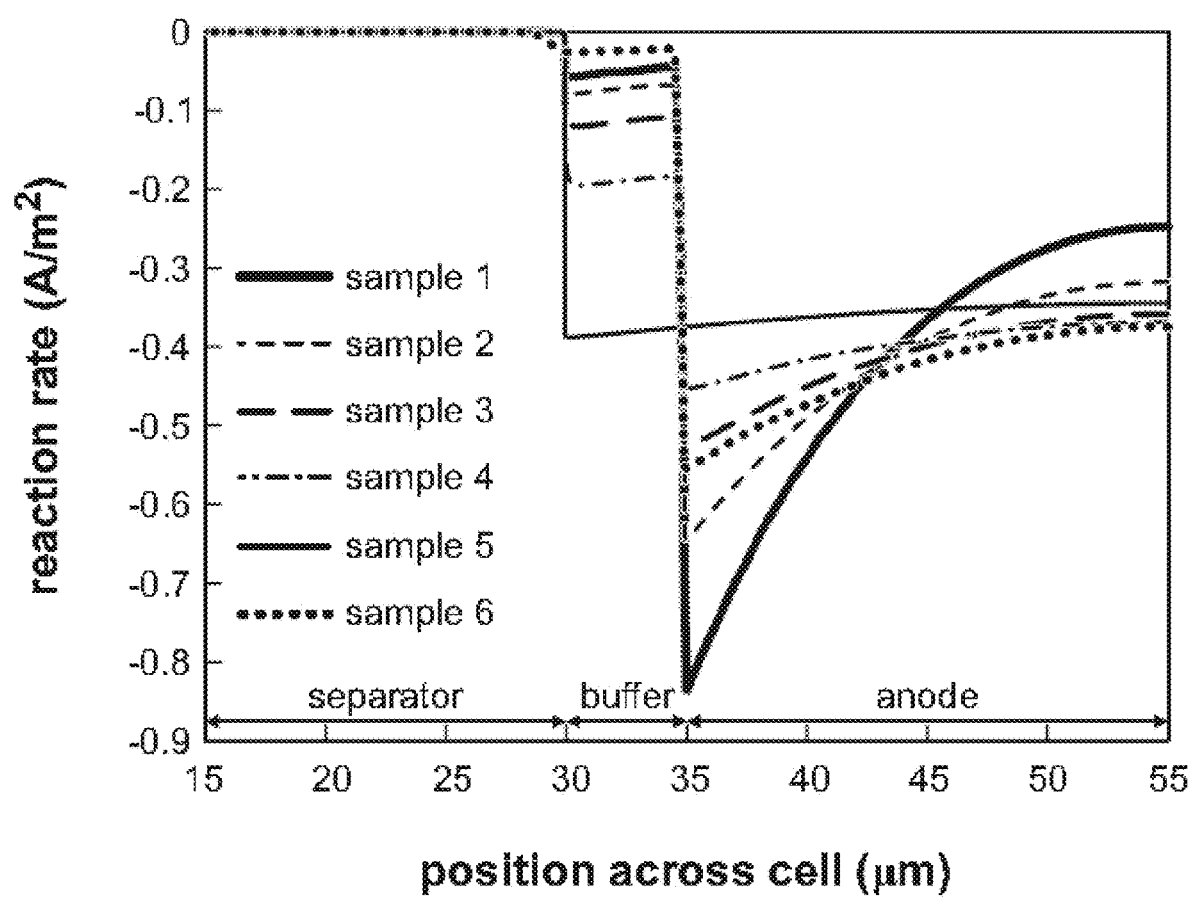
FIG. 5 shows simulated reaction-rate distributions for different values of the charge-transfer resistance for an LLZO electrolyte.

FIG. 5 shows the simulated reaction-rate distribution for LLZO electrolyte after charging at 5 A/$m^2$ for 1 minute for different values of $R_{ct,a}$ and $R_{ct,b}$. Charge-transfer resistances in the negative electrode ($R_{ct,a}$) and buffer regions ($R_{ct,b}$) (reported in Ohm·$m^2$) are shown below in Table 2.

TABLE 2

| Sample | $R_{ct,a}$ | $R_{ct,b}$ |
| --- | --- | --- |
| 1 | 0.005 | 0.1 |
| 2 | 0.01 | 0.1 |
| 3 | 0.02 | 0.1 |
| 4 | 0.04 | 0.1 |
| 5 | 0.1 | 0.1 |
| 6 | 0.02 | 0.5 |

The reaction-rate distribution is constant with time after a few seconds, because lithium metal's electronic conductivity is so much higher than the electrolyte's ionic conductivity. If $R_{ct,b}$ is too low relative to $R_{ct,a}$, then the amount of lithium deposited in the buffer region becomes too high. If $R_{ct,a}$ is too low, then the reaction rate is very nonuniform across the negative electrode, with reaction rate highest adjacent to the buffer region.

Such a nonuniform reaction distribution could lead to filling of voids followed by lithium being pushed into the buffer region. Porous-electrode theory teaches that a key parameter governing the current distribution across a porous electrode is the ratio v of ohmic resistance to charge-transfer resistance (J. Newman and K. E. Thomas-Alyea, Electrochemical Systems $3^{rd}$ edition, John Wiley & Sons, Hoboken, N.J., 2004, eq. 22.25, the content of which is incorporated herein by reference in its entirety):

$$v^2 = \frac{aL^2}{R_{ct}}\left(\frac{1}{\kappa_{eff}} + \frac{1}{\sigma_{eff}}\right)$$

For v<1, the current distribution is uniform across the thickness of the porous electrode.

Further analysis shows that filling pores in the buffer layer by deposited metal is avoided for $$R_{ct,b} > 30 R_{ct,a} \text{ and } \frac{aL^2}{R_{ct,a}}\left(\frac{1}{\kappa_{eff}} + \frac{1}{\sigma_{eff}}\right) < 1,$$

where a is surface area per volume, L is thickness of the negative electrode region, $\kappa_{eff}$ is effective electrolyte conductivity, and $\sigma_{eff}$ is effective electronic conductivity.

Example 3: Fabrication

Sodium β" $Al_2O_3$ has been commercialized as a separator in high temperature molten-sodium batteries. It is stable with sodium metal, has good mechanical strength, and demonstrates a relatively high room-temperature conductivity of 2.1 mS/cm. Upon exposure to air, it forms a highly resistive surface coating. Protecting the surface with a coating such as a metal serves as a barrier to prevent reaction of the electrolyte with air. (B. Dunn, J. Am. Ceram. Soc. 1982 vol. 64 (3) p. 125-128).

To fabricate a sodium battery that can operate at room temperature, a layer of about 20 micrometers thick of porous Na β" $Al_2O_3$ is coated onto a dense separator of Na β" $Al_2O_3$ and sintered to form good ionic contact. Melted parafin wax is spread onto the porous electrolyte. Vacuum is applied to the surface of the separator opposite the porous layer, and inert gas pressure is applied to the surface of the porous layer opposite the separator, until the wax infiltrates the pores in a region of about 5 microns thick adjacent to the separator, thereby defining the first region of electrolyte. A metal which alloys with sodium to form an alloy with high sodium diffusivity and low surface energy with sodium metal, such as Sn, is then coated onto the surface of the wax-free second region of the electrolyte. The electrolyte is then heated to remove the wax, and exposed to humid air to form a resistive surface on the first region.

Figure 6:
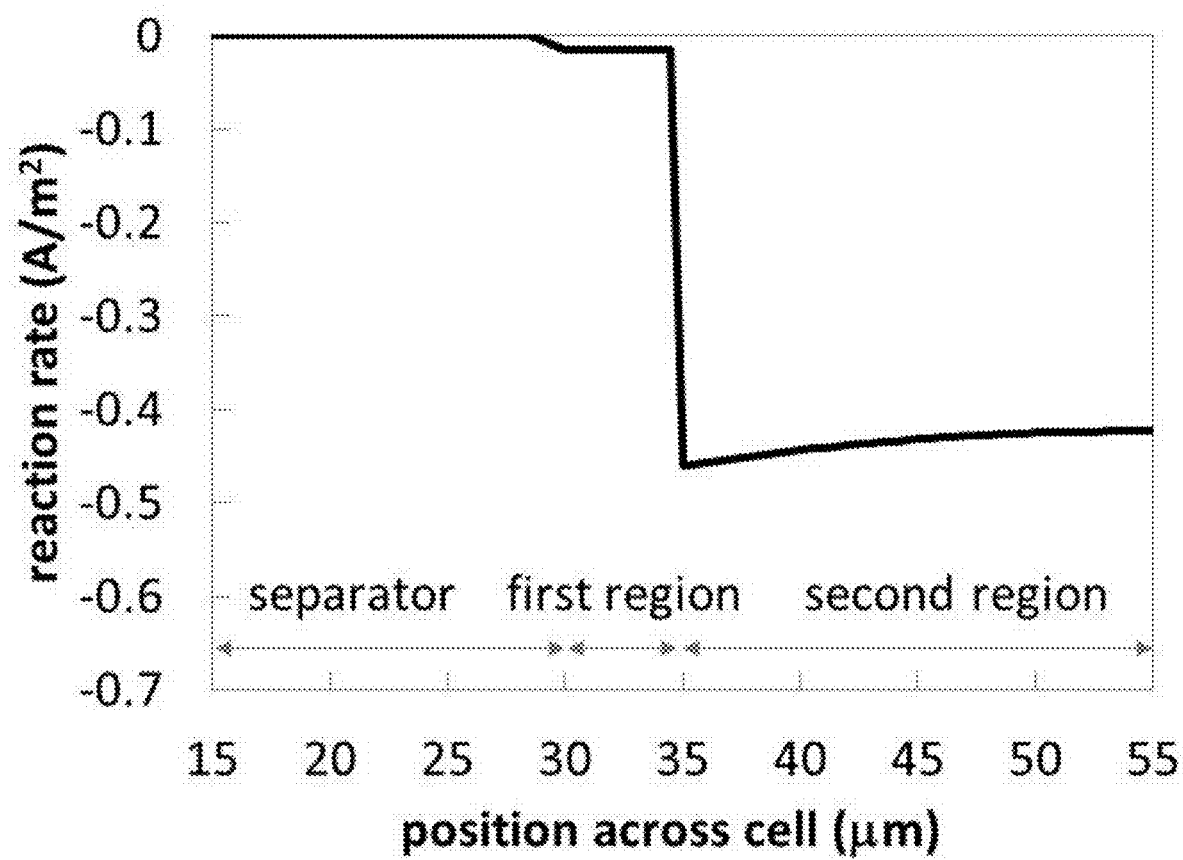
FIG. 6 shows simulated reaction-rate distributions for a sodium $\beta''$ $Al_2O_3$ electrolyte.

The reaction-rate distribution in this system is simulated with the same model framework described in Example 2. The electrolyte is sodium β" $Al_2O_3$ having a conductivity of 0.2 S/m, the charge-transfer resistance in the second region is 0.04 Ohm-$m^2$, the charge-transfer resistance in the first region is 1.2 Ohm-$m^2$, and thicknesses, volume fractions, and surface areas are the same as given in Example 2. The simulated reaction-rate distribution shows that these material properties result in the amount of metal deposition in the first region being less than 4% of the amount of metal deposition in the second region. FIG. 6 shows the simulated reaction-rate distribution for the sodium β" $Al_2O_3$ electrolyte.

This disclosure further encompasses the following embodiments.

Embodiment 1

A solid electrolyte for a negative electrode of a secondary battery, the solid electrolyte comprising: a first solid electrolyte having a first surface; and a second solid electrolyte on the first solid electrolyte, the second solid electrolyte having a second surface, wherein the first solid electrolyte and the second solid electrolyte each have an ionic conductivity effective for a deposition metal, and wherein the first surface and the second surface are different in composition, structure, or both.

Embodiment 2

The solid electrolyte of embodiment 1, wherein the first surface has a first surface energy towards the deposition metal and the second surface has a second surface energy towards the deposition metal, and wherein the first surface energy is greater than the second surface energy.

Embodiment 3

The solid electrolyte of embodiment 1, wherein the first surface has a first charge transfer resistance for deposition of the deposition metal and the second surface has a second charge transfer resistance for deposition of the deposition metal, and wherein the first charge transfer resistance is greater than the second charge transfer resistance.

Embodiment 4

The solid electrolyte of embodiment 3, wherein a ratio of the first charge transfer resistance to the second charge transfer resistance is greater than 30.

Embodiment 5

The solid electrolyte of embodiment 1, wherein the first surface has a first surface energy towards the deposition metal and the second surface has a second surface energy towards the deposition metal, and wherein the first surface energy is greater than the second surface energy, and wherein the first surface has a first charge transfer resistance for deposition of the deposition metal and the second surface has a second charge transfer resistance for deposition of the deposition metal, and wherein the first charge transfer resistance is greater than the second charge transfer resistance.

Embodiment 6

The solid electrolyte of any one or more of embodiments 1 to 5, wherein at least one of the first solid electrolyte or the second solid electrolyte is porous.

Embodiment 7

The solid electrolyte of embodiment 6, wherein the first solid electrolyte and the second solid electrolyte comprise a void, wherein the void extends through the first solid electrolyte and the second solid electrolyte, and wherein the void is defined by the first surface of the first solid electrolyte and the second surface of the second solid electrolyte.

Embodiment 8

The solid electrolyte of any one or more of embodiments 1 to 7, wherein the deposition metal comprises Li, Na, K, Mg, Zn, Ag, Al, or a combination thereof.

Embodiment 9

The solid electrolyte of any one or more of embodiments 1 to 8, wherein the deposition metal comprises Li, Na, Mg, or combination thereof.

Embodiment 10

The solid electrolyte of any one or more of embodiments 1 to 9, wherein the deposition metal is Li.

Embodiment 11

The solid electrolyte of any one or more of embodiments 1 to 10, wherein a length $L_1$ of the first solid electrolyte is equal to or less than a length $L_2$ of the second solid electrolyte.

Embodiment 12

The solid electrolyte of any one or more of embodiments 1 to 11, wherein a ratio of $L_1:L_2$ is 0.01 to 1.

Embodiment 13

The solid electrolyte of any one or more of embodiments 1 to 12, wherein an area of the first surface is less than an area of the second surface.

Embodiment 14

The solid electrolyte of any one or more of embodiments 1 to 13, wherein a ratio of the area of the first surface to the area of the second surface is 0.1 to 1.

Embodiment 15

The solid electrolyte of any one or more of embodiments 1 to 14, wherein the first solid electrolyte and the second solid electrolyte each independently comprise a glass, a ceramic, a polymer, or a combination thereof.

Embodiment 16

The solid electrolyte of any one or more of embodiments 1 to 15, wherein the first solid electrolyte and the second solid electrolyte each independently comprise a ceramic comprising a lithium ceramic or a glass ceramic.

Embodiment 17

The solid electrolyte of embodiment 16, wherein the lithium ceramic or glass ceramic comprises a garnet oxide of the formula $Li_{5+x+2y}(D_yLa_{3-y})(Me_zZr_{2-z})O_d$, wherein D is a monovalent or divalent cation, Me is one of a trivalent, tetravalent, pentavalent, and a hexavalent cation, $0<x+2y\leq3$, $0<y\leq0.5$, $0\leq z<2$, and $0<d\leq12$, optionally wherein O is partially or totally substituted with a pentavalent anion, a hexavalent anion, a heptavalent anion, or combination thereof; an antiperovskite of the formula $A_3RX$ wherein A is Li or Na; X is Cl, Br, I, or a super halide, or a combination thereof, and R is O or S; an oxide solid electrolyte of the formula $Li_{1+/-x}M1_xM2_{2-x}(PO_4)_3$, wherein M1 is Al, Ga, In, Sc, Cr, Fe, Ta, or Nb; M2 is Ti, Zr, Hf, or Ge, and $0<x<1$; or $(La_{1-x}Li_x)TiO_3$ wherein $0<x<1$; a sulfide ceramic or glass electrolyte comprising $Li_6PS_5X$ wherein X is Cl, Br, or I; $Li_{10}MP_2S_{12}$ wherein M is Ge, Si, or Sn; $Li_2S$—$P_2S_5$; $Li_2S$—$P_2S_5$-$L_4SiO_4$; $Li_2S$—$Ga_2S_3$—$GeS_2$; $Li_2S$—$Sb_2S_3$—$GeS_2$; $Li_{3.25}$—$Ge_{0.25}$—$P_{0.75}S_4$; $Li_3PS_4$; $Li_7P_3S_{11}$; $Li_3N$; $Li_2S$; $LiBH_4$; or $Li_3BO_3$; or a combination thereof.

Embodiment 18

The solid electrolyte of embodiment 16, wherein the lithium ceramic or glass ceramic comprises $Li_7La_3Zr_2O_{12}$; $Li_3OX$ wherein X is Cl, Br, I, or $BH_4$; $Li_{1.3}Al_{0.3}Ti_{1.7}(PO_4)_3$; $Li_6PS_5Cl$; $Li_{10}MP_2Si_2$ wherein M is Ge, Si, or Sn; $Li_3PS_4$; $Li_7P_3S_{11}$; $Li_3N$; $Li_2S$; $LiBH_4$; $Li_3BO_3$; $Li_2S$—$P_2S_5$; $Li_2S$—$P_2S_5$-$L_4SiO_4$; $Li_2S$—$Ga_2S_3$—$GeS_2$; $Li_2S$—$Sb_2S_3$—$GeS_2$; $Li_{3.25}$—$Ge_{0.25}$—$P_{0.75}S_4$; $(La_{1-x}Li_x)TiO_3$ wherein $0<x<1$; $Li_6La_2CaTa_2O_{12}$; $Li_6La_2ANb_2O_{12}$ wherein A comprises Ca, Sr, Ba; $Li_6La_3Zr_{1.5}WO_{12}$; $Li_{6.5}La_3Zr_{1.5}TaO_{12}$; $Li_{6.625}Al_{0.25}La_3Zr_2O_{12}$; $Li_3BO_{2.5}N_{0.5}$; $Li_9SiAlO_8$; $Li_{1+x}Al_xGe_{2-x}(PO_4)_3$; $Li_{1+x}Al_xTi_{2-x}(PO_4)_3$; $Li_{1+x}Ti_{2-x}Al_xSi_y(PO_4)_{3-y}$ wherein $0<x<1$ and $0\leq y<1$; $LiAl_xZr_{2-x}(PO_4)_3$; $LiTi_xZr_{2-x}(PO_4)_3$, or a combination thereof.

Embodiment 19

The solid electrolyte of any one or more of embodiments 1 to 19, wherein the first solid electrolyte and the second solid electrolyte each independently have an ionic conductivity for Li, Na, K, Mg, Zn, Ag, Al, or a combination thereof of at least $10^{-3}$ S/m.

Embodiment 20

The solid electrolyte of any one or more of embodiments 1 to 19, wherein the first solid electrolyte and the second solid electrolyte are different in bulk composition, morphology, or both.

Embodiment 21

The solid electrolyte of any one or more of embodiments 1 to 20, wherein the first surface has a composition that is different from a bulk composition of the first solid electrolyte, the second surface has a composition that is different from a bulk composition of the second solid electrolyte, or the first surface has a composition that is different from a bulk composition of the first solid electrolyte and the second surface has a composition that is different from a bulk composition of the second solid electrolyte.

Embodiment 22

The solid electrolyte of any one or more of embodiments 1 to 22, wherein the first surface and the second surface each independently further comprise a carbonate, a halogen, an oxide, a polymer, a silicide, a phosphide, a sulfide, a metal of Groups 2 to 16, or a combination thereof.

Embodiment 23

The solid electrolyte of embodiment 22, wherein the polymer comprises a polyacetal, a polyolefin, a poly(alkylene oxide), a poly(meth)acrylate, a polycarbonate, a polystyrene, a polyester, a polyamide, a polyamideimide, a polyarylate, a polyarylsulfone, a polyethersulfone, a polyphenylene sulfide, a polyvinyl chloride, a polysulfone, a polyimide, a polyetherimide, a polytetrafluoroethylene, a polyetherketone, a polyether etherketone, a polyether ketone ketone, a polybenzoxazole, a polyphthalide, a polyacetal, a polyanhydride, a polyvinyl ether, a polyvinyl thioether, a polyvinyl alcohol, a polyvinyl ketone, a polyvinyl halide, a polyvinyl nitrile, a polyvinyl ester, a polysulfonate, a polysulfide, a polythioester, a polysulfone, a polysulfonamide, a polyurea, a polyphosphazene, a polysilazane, a polyethylene terephthalate, a polybutylene terephthalate, a polyurethane, an ethylene propylene diene rubber, a polytetrafluoroethylene, a fluorinated ethylene propylene, a perfluoroalkoxyethylene, a polychlorotrifluoroethylene, a polyvinylidene fluoride, or a combination thereof.

Embodiment 24

The solid electrolyte of any one or more of embodiments 1 to 22, wherein the first surface further comprises a carbonate, a halogen, an oxide, a polymer, or combination thereof.

Embodiment 25

The solid electrolyte of embodiment 24, wherein the carbonate comprises lithium carbonate, the halogen comprises lithium fluoride, and the oxide comprises lithium oxide, lanthanum oxide, zirconium oxide, lanthanum zirconium oxide, hafnium oxide, calcium oxide, gadolinium oxide, samarium oxide, yttrium oxide, or combination thereof.

Embodiment 26

The solid electrolyte of embodiment 24, wherein the polymer comprises polyethylene, polypropylene, polystyrene, poly(ethylene oxide), poly(methacrylate), poly(imide), or a combination thereof.

Embodiment 27

The solid electrolyte of any one or more of embodiments 1 to 22, wherein the second surface further comprises an oxide, a silicide, a phosphide, a sulfide, a carbonate, an aluminum oxide, magnesium, niobium, gold, silver, calcium, indium, tin, antimony, zinc, a polymer, or a combination thereof.

Embodiment 28

The solid electrolyte of embodiment 27, wherein the second surface further comprises lithium oxide, lithium carbonate, lithium silicide, lithium phosphide, lithium sulfide, lithium aluminum oxide, a lithium-magnesium alloy, lithium nitride, a lithium-niobium alloy, a lithium-gold alloy, a lithium-silver alloy, a lithium-aluminum alloy, a lithium-calcium alloy, a lithium-indium alloy, a lithium-tin alloy, a lithium-antimony alloy, a lithium-zinc alloy, or a combination thereof.

Embodiment 29

The solid electrolyte of embodiment 27, wherein the polymer comprises polyethylene, polypropylene, polystyrene, poly(ethylene oxide), poly(methacrylate), poly(imide), polypropylene oxide, polyvinylidene fluoride, polystyrene, polyvinyl chloride, polyvinyl alcohol, polyacrylonitrile, polyester sulfide, poly(ethylene oxide) doped with a sodium salt, poly(ethylene oxide) doped with a lithium salt, or a combination thereof.

Embodiment 30

The solid electrolyte of embodiment 22, wherein the first surface comprises the carbonate, the halogen, the oxide, the polymer, or combination thereof in a first amount, the second surface comprises the oxide, the carbonate, the silicide, the phosphide, the sulfide, the aluminum oxide, the magnesium, the niobium, the gold, the silver, the calcium, the indium, the tin, the antimony, the zinc, the polymer, or a combination thereof in a second amount, and the first amount and the second amount are different.

Embodiment 31

The solid electrolyte of any one or more of embodiments 1 to 30, further comprising a current collector disposed on the second solid electrolyte and opposite the first solid electrolyte.

Embodiment 32

The solid electrolyte of embodiment 31, wherein the current collector comprises copper, titanium, stainless steel, or combination thereof.

Embodiment 33

The solid electrolyte of any one or more of embodiments 1 to 32, further comprising an insulating frame surrounding one or both of the first and second solid electrolyte, wherein the insulating frame is non-porous.

Embodiment 34

An electrode assembly for an electrochemical cell, the electrode assembly comprising: at least one of a current collector and a separator; and the solid electrolyte of any one or more of embodiments 1 to 33; wherein the solid electrolyte is disposed on the current collector if present, on the separator if present, or between the current collector and the separator if both are present, wherein the first surface of the first solid electrolyte and the second surface of the second solid electrolyte define a void, which extends from the current collector to the separator.

Embodiment 35

The electrode assembly of embodiment 34, wherein the separator has a composition that is the same as a bulk composition of the first solid electrolyte.

Embodiment 36

The electrode assembly of embodiment 34 or 35, wherein the composition of the separator and the bulk composition of the first solid electrolyte are the same as a bulk composition of the second solid electrolyte.

Embodiment 37

An electrochemical cell comprising: a positive electrode; and the electrode assembly of embodiments 34 to 36 disposed on the positive electrode.

Embodiment 38

The electrochemical cell of embodiment 37, further comprising the deposition metal disposed on the current collector, the first surface of the first solid electrolyte, the second surface of the second solid electrolyte, or a combination thereof.

Embodiment 39

The electrochemical cell of embodiment 38, wherein an amount of the deposition metal disposed on the first surface is less than an amount of the deposition metal disposed on the second surface.

Embodiment 40

The electrochemical cell of embodiment 38 or 39, wherein at least a portion of the void adjacent to the separator and defined by the first surface of the first solid electrolyte is substantially free of the deposition metal at all states of charge of the electrochemical cell.

Embodiment 41

A solid electrolyte for a negative electrode for a secondary battery, the solid electrolyte comprising: a first solid electrolyte having a first surface; and a second solid electrolyte on the first solid electrolyte, the second solid electrolyte having a second surface; wherein the first solid electrolyte and the second solid electrolyte each have an ionic conductivity effective for a deposition metal, wherein the first surface and the second surface each independently further comprise a carbonate, a halogen, an oxide, a polymer, an oxide, a silicide, a phosphide, a sulfide, an oxide, a metal of Groups 2 to 16, or a combination thereof, and wherein the first surface and the second surface are different.

Embodiment 42

The solid electrolyte of embodiment 41, wherein the first surface and the second surface each comprise the carbonate, wherein the carbonate is present on the first surface in a first amount and the carbonate is present on the second surface in a second amount, wherein the first amount is greater than the second amount.

Embodiment 43

An electrochemical cell comprising: a positive electrode; a separator disposed adjacent to the positive electrode;

negative electrode comprising a first porous solid electrolyte adjacent to the separator and opposite the positive electrode, a second porous solid electrolyte adjacent to the first porous solid electrolyte and opposite the separator, wherein the first porous solid electrolyte and the second porous solid electrolyte define a void which is adjacent the separator; and a current collector disposed on the second porous solid electrolyte and opposite the first porous solid electrolyte, wherein a first surface of the first porous solid electrolyte and a second surface of the second solid electrolyte are different in composition, structure, or both.

Embodiment 44

The electrochemical cell of embodiment 43, wherein the first surface has as first surface energy towards a deposition metal and the second surface has a second surface energy towards the deposition metal, and wherein the first surface energy is greater than the second surface energy; or wherein the first surface has as first charge transfer resistance for deposition of the deposition metal and the second surface has a second charge transfer resistance for deposition of the deposition metal, and wherein the first charge transfer resistance is greater than the second charge transfer resistance, or both.

Embodiment 45

The electrochemical cell of embodiment 44, wherein the deposition metal comprises Li, Na, K, Mg, Zn, Ag, Al, or a combination thereof, and wherein the deposition metal is disposed on the surface of the second porous solid electrolyte.

Embodiment 46

A method of manufacturing an electrode assembly, the method comprising: providing a first composition comprising a solid electrolyte and a solvent; disposing the first composition on a substrate; removing the solvent to form a layer comprising the solid electrolyte; heat-treating the layer in the absence of $CO_2$ and $H_2O$ to provide a porous solid electrolyte layer on the substrate; disposing a surface modifier on a portion of a surface of the porous solid electrolyte to provide a second solid electrolyte layer having a second surface; and contacting the porous solid electrolyte layer with air to form a first solid electrolyte layer adjacent to the substrate, the first solid electrolyte layer comprising a first surface different from the second surface to manufacture the electrode assembly.

Embodiment 47

The method of embodiment 46, wherein the surface modifier comprises a carbonate, a halogen, an oxide, a polymer, an oxide, a silicide, a phosphide, a sulfide, an oxide, a metal of Groups 2 to 16, or a combination thereof.

Embodiment 48

The method of embodiment 46 or 47, further comprising disposing the electrode assembly on a current collector.

Embodiment 49

A method of manufacturing an electrochemical cell, the method comprising disposing a positive electrode on the electrode assembly made by the method of any of embodiments 46 to 48 to provide the electrochemical cell.

The compositions, methods, and articles can alternatively comprise, consist of, or consist essentially of, any appropriate components or steps herein disclosed. The compositions, methods, and articles can additionally, or alternatively, be formulated so as to be devoid, or substantially free, of any steps, components, materials, ingredients, adjuvants, or species that are otherwise not necessary to the achievement of the function or objectives of the compositions, methods, and articles.

All ranges disclosed herein are inclusive of the endpoints, and the endpoints are independently combinable with each other. "Combinations" is inclusive of blends, mixtures, alloys, reaction products, and the like. The terms "first," "second," and the like, do not denote any order, quantity, or importance, but rather are used to distinguish one element from another. The terms "a" and "an" and "the" do not denote a limitation of quantity, and are to be construed to cover both the singular and the plural, unless otherwise indicated herein or clearly contradicted by context. "Or" means "and/or" unless clearly stated otherwise. Reference throughout the specification to "some embodiments", "an embodiment", and so forth, means that a particular element described in connection with the embodiment is included in at least one embodiment described herein, and may or may not be present in other embodiments. In addition, it is to be understood that the described elements may be combined in any suitable manner in the various embodiments.

Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A solid electrolyte for a negative electrode of a secondary battery, the solid electrolyte comprising:
    a first solid electrolyte having a first surface; and
    a second solid electrolyte on the first solid electrolyte, the second solid electrolyte having a second surface,
    wherein the first solid electrolyte and the second solid electrolyte each have an ionic conductivity effective for a deposition metal,
    wherein the first surface and the second surface are different in composition or composition and structure,
    wherein a ratio of a length $L_1$ of the first solid electrolyte to a length $L_2$ of the second solid electrolyte is 0.1 to 1, and
    wherein the solid electrolyte has a total length $(L_1+L_2)$ if 10 to 1,000 micrometers.

2. The solid electrolyte of claim 1, further comprising an insulating frame surrounding one or both of the first and second solid electrolyte, wherein the insulating frame is non-porous.

3. The solid electrolyte of claim 1, wherein the deposition metal comprises Li, Na, K, Mg, Zn, Ag, Al, or a combination thereof.

4. The solid electrolyte of claim 1, wherein the deposition metal comprises Li, Na, Mg, or combination thereof.

5. The solid electrolyte of claim 1, wherein the deposition metal is Li.

6. The solid electrolyte of claim 1, wherein the first solid electrolyte and the second solid electrolyte are different in bulk composition, morphology, or both.

7. The solid electrolyte of claim 1, wherein the first solid electrolyte and the second solid electrolyte each independently have an ionic conductivity for Li, Na, K, Mg, Zn, Ag, Al, or a combination thereof of at least $10^{-3}$ S/m.

8. The solid electrolyte of claim 1, wherein at least one of the first solid electrolyte or the second solid electrolyte is porous.

9. The solid electrolyte of claim 8, wherein the first solid electrolyte and the second solid electrolyte comprise a void, wherein the void extends through the first solid electrolyte and the second solid electrolyte, and wherein the void is defined by the first surface of the first solid electrolyte and the second surface of the second solid electrolyte.

10. The solid electrolyte of claim 1, wherein the first solid electrolyte and the second solid electrolyte each independently comprise a glass, a ceramic, a polymer, or a combination thereof.

11. The solid electrolyte of claim 10, wherein the first solid electrolyte and the second solid electrolyte each independently comprise a ceramic comprising a lithium ceramic or a glass ceramic.

12. The solid electrolyte of claim 11, wherein the lithium ceramic or glass ceramic comprises $Li_7La_3Zr_2O_{12}$; $Li_3OX$ wherein X is Cl, Br, or I; $Li_{1.3}Al_{0.3}Ti_{1.7}(PO_4)_3$, $Li_6PS_5Cl$; $Li_{10}MP2S_{12}$ wherein M is Ge, Si, or Sn; $Li_3PS_4$; $Li_7P_3S_{11}$; $Li_3N$; $Li_2S$; $LiBH_4$; $Li_3BO_3$; $Li_2S$—$P_2S_5$; $Li_2S$—$P_2S_5$-$L_4SiO_4$; $Li_2S$—$Ga_2S_3$—$GeS_2$; $Li_2S$—$Sb_2S_3$—$GeS_2$; $Li_{3.25}$—$Ge_{0.25}$—$P_{0.75}S_4$; $(La_{1-x}Li_x)TiO_3$ wherein $0<x<1$; $Li_6La_2CaTa_2O_{12}$; $Li_6La_2ANb_2O_{12}$ wherein A comprises Ca, Sr, Ba; $Li_6La_2Zr_{1.5}WO_{12}$; $Li_{6.5}La_3Zr_{1.5}TaO_{12}$; $Li_{6.625}Al_{0.25}La_3Zr_2O_{12}$; $Li_3BO_{2.5}N_{0.5}$; $Li_9SiAlO_8$; $Li_{1+x}Al_xGe_{2-x}(PO_4)_3$; $Li_{1+x}Al_xTi_{2-x}(PO_4)_3$; $Li_{1+x}Ti_{2-x}Al_xSi_y(PO_4)_{3-y}$ wherein $0<x<1$ and $0\leq y<1$; $LiAl_xZr_{2-x}(PO_4)_3$; $LiTi_xZr_{2-x}(PO_4)_3$ wherein $0<x<2$, or a combination thereof.

13. The solid electrolyte of claim 11, wherein the lithium ceramic or glass ceramic comprises
a garnet oxide of the formula $L_{5+x+2}$ $y(D_yLa_{3-y})(Me_zZr_{2-z})O_d$, wherein L is a monovalent cation or a divalent cation, and provided that at least a part of or all of L is Li, wherein D is a monovalent or divalent cation, Me is one of a trivalent, tetravalent, pentavalent, and a hexavalent cation, $0<x+2y\leq 3$, $0<y\leq 0.5$, $0\leq z<2$, and $0<d\leq 12$, optionally wherein O is partially or totally substituted with a pentavalent anion, a hexavalent anion, a heptavalent anion, or combination thereof;
an antiperovskite of the formula $A_3RX$ wherein A is Li or Na; X is Cl, Br, I, or a super halide, or a combination thereof; and R is O or S;
an oxide solid electrolyte of the formula $Li_{1+/-x}M1_xM2_{2-x}(PO_4)_3$, wherein M1 is Al, Ga, In, Sc, Cr, Fe, Ta, or Nb; M2 is Ti, Zr, Hf, or Ge, and $0<x<1$; or $(La_{1-x}Li_x)TiO_3$ wherein $0<x<1$;
a sulfide ceramic or glass electrolyte comprising $Li_6PS_5X$ wherein X is Cl, Br, or I; $Li_{10}MP2S_{12}$ wherein M is Ge, Si, or Sn; $Li_2S$—$P_2S_5$; $Li_2S$—$P_2S_5$-$L_4SiO_4$; $Li_2S$—$Ga_2S_3$—$GeS_2$; $Li_2S$—$Sb_2S_3$—$GeS_2$; $Li_{3.25}$—$Ge_{0.25}$—$P_{0.75}S_4$; $Li_3PS_4$; $Li_7P_3S_{11}$; $Li_3N$; $Li_2S$; $LiBH_4$; or $Li_3BO_3$;
or a combination thereof.

14. The solid electrolyte of claim 1, wherein the first surface has a first surface energy towards the deposition metal and the second surface has a second surface energy towards the deposition metal, and wherein the first surface energy is greater than the second surface energy.

15. The solid electrolyte of claim 1, wherein the first surface has a composition that is different from a bulk composition of the first solid electrolyte, the second surface has a composition that is different from a bulk composition of the second solid electrolyte, or the first surface has a composition that is different from a bulk composition of the first solid electrolyte and the second surface has a composition that is different from a bulk composition of the second solid electrolyte.

16. The solid electrolyte of claim 1,
wherein the first surface has a first surface energy towards the deposition metal and the second surface has a second surface energy towards the deposition metal, and wherein the first surface energy is greater than the second surface energy, and
wherein the first surface has a first charge transfer resistance for deposition of the deposition metal and the second surface has a second charge transfer resistance for deposition of the deposition metal, and wherein the first charge transfer resistance is greater than the second charge transfer resistance.

17. The solid electrolyte of claim 1, wherein an area of the first surface is less than or equal to an area of the second surface.

18. The solid electrolyte of claim 17, wherein a ratio of the area of the first surface to the area of the second surface is 0.1 to 1.

19. The solid electrolyte of claim 1, wherein the first surface has a first charge transfer resistance for deposition of the deposition metal and the second surface has a second charge transfer resistance for deposition of the deposition metal, and wherein the first charge transfer resistance is greater than the second charge transfer resistance.

20. The solid electrolyte of claim 19, wherein a ratio of the first charge transfer resistance to the second charge transfer resistance is greater than 30.

21. The solid electrolyte of claim 1, wherein the first surface and the second surface each independently further comprise a carbonate, a halogen, an oxide, a polymer, a silicide, a phosphide, a sulfide, a metal of Groups 2 to 16, or a combination thereof.

22. The solid electrolyte of claim 21, wherein the first surface comprises the carbonate, the halogen, the oxide, the polymer, or combination thereof in a first amount, the second surface comprises the oxide, the carbonate, the silicide, the phosphide, the sulfide, the aluminum oxide, the magnesium, the niobium, the gold, the silver, the calcium, the indium, the tin, the antimony, the zinc, the polymer, or a combination thereof in a second amount, and the first amount and the second amount are different.

23. The solid electrolyte of claim 21,
wherein the polymer comprises a polyacetal, a polyolefin, a poly(alkylene oxide), a poly(meth)acrylate, a polycarbonate, a polystyrene, a polyester, a polyamide, a polyamideimide, a polyarylate, a polyarylsulfone, a polyethersulfone, a polyphenylene sulfide, a polyvinyl chloride, a polysulfone, a polyimide, a polyetherimide, a polytetrafluoroethylene, a polyetherketone, a polyether etherketone, a polyether ketone ketone, a polybenzoxazole, a polyphthalide, a polyanhydride, a polyvinyl ether, a polyvinyl thioether, a polyvinyl alcohol, a polyvinyl ketone, a polyvinyl halide, a polyvinyl nitrile, a polyvinyl ester, a polysulfonate, a polysulfide, a polythioester, a polysulfone, a polysulfonamide, a polyurea, a polyphosphazene, a polysilazane, a polyethylene terephthalate, a polybutylene terephthalate, a polyurethane, an ethylene propylene diene rubber, a polytetrafluoroethylene, a fluorinated ethylene propylene, a perfluoroalkoxyethylene, a polychlorotrifluoroethylene, a polyvinylidene fluoride, or a combination thereof.

24. The solid electrolyte of claim 21, wherein the first surface further comprises a carbonate, a halogen, an oxide, a polymer, or combination thereof.

25. The solid electrolyte of claim 24, wherein the carbonate comprises lithium carbonate, the halogen comprises lithium fluoride, and the oxide comprises lithium oxide, lanthanum oxide, zirconium oxide, lanthanum zirconium oxide, hafnium oxide, calcium oxide, gadolinium oxide, samarium oxide, yttrium oxide, or combination thereof.

26. The solid electrolyte of claim 24, wherein the polymer comprises polyethylene, polypropylene, polystyrene, poly(ethylene oxide), poly(methacrylate), poly(imide), or a combination thereof.

27. The solid electrolyte of claim 21, wherein the second surface further comprises an oxide, a silicide, a phosphide, a sulfide, a carbonate, an aluminum oxide, magnesium, niobium, gold, silver, calcium, indium, tin, antimony, zinc, a polymer, or a combination thereof.

28. The solid electrolyte of claim 27, wherein the second surface further comprises lithium oxide, lithium carbonate, lithium silicide, lithium phosphide, lithium sulfide, lithium aluminum oxide, a lithium-magnesium alloy, lithium nitride, a lithium-niobium alloy, a lithium-gold alloy, a lithium-silver alloy, a lithium-aluminum alloy, a lithium-calcium alloy, a lithium-indium alloy, a lithium-tin alloy, a lithium-antimony alloy, a lithium-zinc alloy, or a combination thereof.

29. The solid electrolyte of claim 27, wherein the polymer comprises polyethylene, polypropylene, polystyrene, poly(ethylene oxide), poly(methacrylate), poly(imide), polypropylene oxide, polyvinylidene fluoride, polystyrene, polyvinyl chloride, polyvinyl alcohol, polyacrylonitrile, polyester sulfide, poly(ethylene oxide) doped with a sodium salt, poly(ethylene oxide) doped with a lithium salt, or a combination thereof.

30. An electrode assembly for an electrochemical cell, the electrode assembly comprising:
at least one of a current collector and a separator; and
the solid electrolyte of claim 1;
wherein the solid electrolyte is disposed on the current collector if present, on the separator if present, or between the current collector and the separator if both are present,
wherein the first surface of the first solid electrolyte and the second surface of the second solid electrolyte define a void, which extends through the solid electrolyte.

31. The electrode assembly of claim 30, wherein the separator has a composition that is the same as a bulk composition of the first solid electrolyte.

32. The electrode assembly of claim 31, wherein the composition of the separator and the bulk composition of the first solid electrolyte are the same as a bulk composition of the second solid electrolyte.

33. An electrochemical cell comprising:
a positive electrode; and
the electrode assembly of claim 30 disposed on the positive electrode.

34. The electrochemical cell of claim 33, further comprising the deposition metal disposed on the current collector, the first surface of the first solid electrolyte, the second surface of the second solid electrolyte, or a combination thereof.

35. The electrochemical cell of claim 34, wherein an amount of the deposition metal disposed on the first surface is less than an amount of the deposition metal disposed on the second surface.

36. The electrochemical cell of claim 34, wherein at least a portion of the void adjacent to the separator and defined by the first surface of the first solid electrolyte is substantially free of the deposition metal at all states of charge of the electrochemical cell.

37. A solid electrolyte for a negative electrode for a secondary battery, the solid electrolyte comprising:
a first solid electrolyte having a first surface; and
a second solid electrolyte on the first solid electrolyte, the second solid electrolyte having a second surface;
wherein the first solid electrolyte and the second solid electrolyte each have an ionic conductivity effective for a deposition metal,
wherein the first surface and the second surface each independently further comprise a carbonate, a halogen, an oxide, a polymer, an oxide, a silicide, a phosphide, a sulfide, an oxide, a metal of Groups 2 to 16, or a combination thereof,
wherein the first surface and the second surface are different in composition or composition and structure,
wherein a ratio of a length $L_1$ of the first solid electrolyte to a length $L_2$ of the second solid electrolyte is 0.1 to 1; and
wherein the solid electrolyte has a total length $(L_1+L_2)$ of 10 to 1,000 micrometers.

38. The solid electrolyte of claim 37, wherein the first surface and the second surface each comprise the carbonate, wherein the carbonate is present on the first surface in a first amount and the carbonate is present on the second surface in a second amount, wherein the first amount is greater than the second amount.

39. An electrochemical cell comprising:
a positive electrode;
a separator disposed adjacent to the positive electrode;
negative electrode comprising
a first porous solid electrolyte adjacent to the separator and opposite the positive electrode,
a second porous solid electrolyte adjacent to the first porous solid electrolyte and opposite the separator,
wherein the first porous solid electrolyte and the second porous solid electrolyte define a void which is adjacent the separator; and
a current collector disposed on the second porous solid electrolyte and opposite the first porous solid electrolyte,
wherein a first surface of the first porous solid electrolyte and a second surface of the second solid electrolyte are different in composition or composition and structure,
wherein a ratio of a length $L_1$ of the first solid electrolyte to a length $L_2$ of the second solid electrolyte is 0.1 to 1, and
wherein the solid electrolyte has a total length $(L_1+L_2)$ of 10 to 1,000 micrometers.

40. The electrochemical cell of claim 39,
wherein the first surface has as first surface energy towards a deposition metal and the second surface has a second surface energy towards the deposition metal, and wherein the first surface energy is greater than the second surface energy; or
wherein the first surface has as first charge transfer resistance for deposition of the deposition metal and the second surface has a second charge transfer resistance for deposition of the deposition metal, and wherein the first charge transfer resistance is greater than the second charge transfer resistance.

41. The electrochemical cell of claim 40,
wherein the deposition metal comprises Li, Na, K, Mg, Zn, Ag, Al, or a combination thereof, and
wherein the deposition metal is disposed on the surface of the second porous solid electrolyte.

\* \* \* \* \*